United States Patent
Featherstone et al.

(10) Patent No.: US 12,079,750 B2
(45) Date of Patent: Sep. 3, 2024

(54) TILING PRODUCTION OF PACKAGING MATERIALS

(71) Applicant: Packsize, LLC, Salt Lake City, UT (US)

(72) Inventors: Chris R. Featherstone, Highland, UT (US); Jeffrey Lee Rasmussen, West Jordan, UT (US); Andreas Harnesk, Sandy, UT (US); Ryan Osterhout, West Haven, UT (US); Stefan Karlsson, Salas (SE); Robert Lingstyul, Salt Lake City, UT (US); Clinton P. Smith, Highland, UT (US)

(73) Assignee: Packsize LLC, Salt Lake City, UT (US)

( * ) Notice: Subject to any disclaimer, the term of this patent is extended or adjusted under 35 U.S.C. 154(b) by 0 days.

(21) Appl. No.: 17/110,075

(22) Filed: Dec. 2, 2020

(65) Prior Publication Data

US 2021/0089984 A1    Mar. 25, 2021

Related U.S. Application Data

(60) Division of application No. 15/135,059, filed on Apr. 21, 2016, now Pat. No. 10,922,637, which is a
(Continued)

(51) Int. Cl.
*G06Q 10/0631* (2023.01)
*G06Q 50/04* (2012.01)

(52) U.S. Cl.
CPC ....... *G06Q 10/06313* (2013.01); *G06Q 50/04* (2013.01); *Y02P 90/30* (2015.11)

(58) Field of Classification Search
CPC .... G06Q 10/06313; G06Q 50/04; Y02P 90/30
(Continued)

(56) References Cited

U.S. PATENT DOCUMENTS

| 3,280,531 A | 10/1966 | Meyer-Jagenberg |
| 3,776,419 A | 12/1973 | Zinkgraf et al. |

(Continued)

FOREIGN PATENT DOCUMENTS

| CN | 1484781 A | 3/2004 |
| CN | 101719235 A | 6/2010 |

(Continued)

OTHER PUBLICATIONS

"A mini-line appraoch for pull production", Ahmadi et al., European Journal of Operational Research, 125, 2000, pp. 340-358.
(Continued)

*Primary Examiner* — Abdallah A El-Hage Hassan
(74) *Attorney, Agent, or Firm* — Quarles & Brady LLP

(57) ABSTRACT

Embodiments described herein generally relate to a customizable management system for various unique packaging production architectures. The customizable management system can be configurable to universally integrate with various systems within a variety of unique packaging production architectures. For example, the customizable management system can comprise one or more importer modules that receive package creation requests and translate the requests into a second format that is readable by one or more staging and selection modules. The system may also comprise staging and selection modules that are configured to identify within each translated packaging creation order one or more final packaging parameters and identify a workgroup that is capable of meeting the one or more final packaging parameters. The system may also comprise one or more machine group modules in communication with one or more packaging stations.

16 Claims, 18 Drawing Sheets

Related U.S. Application Data continuation-in-part of application No. 14/761,081, filed as application No. PCT/US2014/012124 on Jan. 17, 2014, now Pat. No. 10,521,741.

(60) Provisional application No. 62/154,545, filed on Apr. 29, 2015, provisional application No. 61/754,462, filed on Jan. 18, 2013.

(58) Field of Classification Search
USPC ........................................................ 705/7.12
See application file for complete search history.

(56) References Cited

U.S. PATENT DOCUMENTS

| | | | |
|---|---|---|---|
| 3,844,422 A | 10/1974 | Tull et al. | |
| 4,149,747 A | 4/1979 | Portz et al. | |
| 4,501,106 A | 2/1985 | Treiber et al. | |
| 4,551,810 A | 11/1985 | Levine | |
| 4,725,961 A | 2/1988 | Pearl | |
| 4,929,226 A | 5/1990 | Focke et al. | |
| 5,069,016 A | 12/1991 | Grossi | |
| 5,299,688 A | 4/1994 | McKay et al. | |
| 5,755,349 A | 5/1998 | Brundle | |
| 6,119,434 A | 9/2000 | Andersson | |
| 6,185,912 B1 | 2/2001 | Artois et al. | |
| 6,358,191 B1 | 3/2002 | Greever | |
| 6,690,990 B1 | 2/2004 | Caron et al. | |
| 6,721,762 B1 | 4/2004 | Levine et al. | |
| 6,834,480 B1 | 12/2004 | Ishino et al. | |
| 6,876,958 B1 | 4/2005 | Chowdhury et al. | |
| 6,980,934 B1 | 12/2005 | Sadovnik | |
| 7,055,350 B2 | 6/2006 | Bonnain et al. | |
| 7,100,811 B2 | 9/2006 | Pettersson et al. | |
| 7,299,103 B1 | 11/2007 | Dye | |
| 7,623,943 B2 | 11/2009 | Huber-Buschbeck et al. | |
| 7,647,752 B2 | 1/2010 | Magnell | |
| 8,086,344 B1 | 12/2011 | Mishra et al. | |
| 8,160,992 B2 | 4/2012 | Gombert et al. | |
| 8,234,008 B2 | 7/2012 | Weber | |
| 8,527,936 B2 | 9/2013 | Jain et al. | |
| 8,560,461 B1 | 10/2013 | Tian et al. | |
| 9,317,626 B2 | 4/2016 | Chan | |
| 9,840,347 B1 | 12/2017 | Linnell et al. | |
| 11,092,946 B2 | 8/2021 | Harnesk | |
| 2002/0072824 A1 | 6/2002 | Susnjara | |
| 2002/0143669 A1 | 10/2002 | Scheer | |
| 2002/0165623 A1 | 11/2002 | Haller et al. | |
| 2002/0165639 A1 | 11/2002 | England et al. | |
| 2003/0019930 A1 | 1/2003 | Hecht | |
| 2003/0037646 A1 | 2/2003 | Ito et al. | |
| 2003/0200111 A1* | 10/2003 | Damji | G06Q 10/08345 705/335 |
| 2004/0158507 A1 | 8/2004 | Meek et al. | |
| 2005/0044171 A1* | 2/2005 | Bechtel | G06K 1/12 709/217 |
| 2005/0065830 A1 | 3/2005 | Duke et al. | |
| 2005/0103923 A1 | 5/2005 | Pettersson et al. | |
| 2005/0114193 A1* | 5/2005 | Kroening | G06Q 10/06 705/400 |
| 2005/0238465 A1 | 10/2005 | Razumov | |
| 2005/0252396 A1 | 11/2005 | Hartka et al. | |
| 2006/0074524 A1 | 4/2006 | Chirnomas | |
| 2006/0151604 A1 | 7/2006 | Zhu et al. | |
| 2006/0208885 A1 | 9/2006 | Lin | |
| 2006/0229927 A1 | 10/2006 | Humphries et al. | |
| 2007/0143134 A1 | 6/2007 | Eller et al. | |
| 2008/0020916 A1* | 1/2008 | Magnell | G01B 11/00 700/112 |
| 2008/0081753 A1 | 4/2008 | Abrott | |
| 2008/0221728 A1 | 9/2008 | Inui | |
| 2008/0269035 A1 | 10/2008 | Ballestrazzi et al. | |
| 2009/0132319 A1 | 5/2009 | Saeed et al. | |
| 2009/0173780 A1 | 7/2009 | Ramamoorthy et al. | |
| 2009/0223782 A1 | 9/2009 | Martin et al. | |
| 2009/0282782 A1 | 11/2009 | Walker et al. | |
| 2009/0287632 A1 | 11/2009 | Gombert et al. | |
| 2009/0287717 A1* | 11/2009 | Gombert | G06F 30/00 |
| 2010/0070073 A1 | 3/2010 | Foley et al. | |
| 2010/0223883 A1* | 9/2010 | Rutschmann | B65B 35/16 53/473 |
| 2010/0234983 A1 | 9/2010 | Gesuita et al. | |
| 2010/0249988 A1 | 9/2010 | Baldes et al. | |
| 2010/0287879 A1 | 11/2010 | Donati et al. | |
| 2011/0319242 A1 | 12/2011 | Pettersson | |
| 2012/0144334 A1 | 6/2012 | Reichert | |
| 2012/0155972 A1* | 6/2012 | Gauthier | C05F 11/00 405/302.6 |
| 2012/0159145 A1* | 6/2012 | Cheong | G06F 8/61 713/100 |
| 2012/0160905 A1 | 6/2012 | Wilkum et al. | |
| 2013/0000252 A1 | 1/2013 | Pettersson et al. | |
| 2013/0017940 A1 | 1/2013 | Bonariva | |
| 2013/0027561 A1 | 1/2013 | Lee et al. | |
| 2013/0070285 A1 | 3/2013 | Gross et al. | |
| 2013/0096735 A1 | 4/2013 | Byford et al. | |
| 2013/0204419 A1 | 8/2013 | Pettersson | |
| 2013/0211977 A1 | 8/2013 | Lyon et al. | |
| 2013/0247519 A1 | 9/2013 | Clark et al. | |
| 2014/0038802 A1 | 2/2014 | Clark et al. | |
| 2014/0058971 A1 | 2/2014 | Muppirala et al. | |
| 2014/0067104 A1 | 3/2014 | Osterhout | |
| 2014/0135966 A1 | 5/2014 | Pettersson et al. | |
| 2014/0351101 A1 | 11/2014 | Danelski | |
| 2015/0019282 A1 | 1/2015 | Kozak | |
| 2015/0081088 A1 | 3/2015 | Lyon et al. | |
| 2015/0307278 A1 | 10/2015 | Wickham et al. | |
| 2015/0332213 A1 | 11/2015 | Galluzzo et al. | |
| 2015/0363716 A1 | 12/2015 | Harnesk et al. | |
| 2016/0167880 A1 | 6/2016 | Pankratov et al. | |
| 2016/0239775 A1 | 8/2016 | Featherstone et al. | |
| 2016/0283953 A1 | 9/2016 | Ettl et al. | |
| 2017/0066592 A1 | 3/2017 | Bastian et al. | |
| 2017/0200117 A1 | 7/2017 | High et al. | |
| 2017/0270466 A1 | 9/2017 | Kao et al. | |
| 2017/0341795 A1 | 11/2017 | Colson et al. | |
| 2018/0157245 A1 | 6/2018 | Harnesk | |
| 2020/0039747 A1 | 2/2020 | Ahmann et al. | |
| 2020/0082308 A1 | 3/2020 | Harnesk et al. | |
| 2021/0341909 A1 | 11/2021 | Harnesk | |

FOREIGN PATENT DOCUMENTS

| | | | |
|---|---|---|---|
| CN | 102521711 A | 6/2012 | |
| EP | 0312877 A2 | 4/1989 | |
| EP | 0999040 A1 | 5/2000 | |
| EP | 2393743 A1 | 12/2011 | |
| IN | 324788 | 4/2012 | |
| IN | 329470 | 4/2012 | |
| JP | 01-136732 A | 5/1989 | |
| JP | 05-257947 A | 10/1993 | |
| JP | 07-244688 A | 9/1995 | |
| JP | 2000-052192 A | 2/2000 | |
| JP | 2000-135696 A | 5/2000 | |
| JP | 2002-145219 A | 5/2002 | |
| JP | 2004-287623 A | 10/2004 | |
| JP | 2006-248575 A | 9/2006 | |
| JP | 2009-116780 A | 5/2009 | |
| JP | 2009-139979 A | 6/2009 | |
| JP | 2009-282914 A | 12/2009 | |
| JP | 2010-201909 A | 9/2010 | |
| JP | 2011-037568 A | 2/2011 | |
| JP | 2012-162376 A | 8/2012 | |
| JP | 2014-529115 A | 10/2014 | |
| JP | 2016-532608 A | 10/2016 | |
| RU | 75372 U1 | 8/2008 | |
| RU | 91933 U1 | 3/2010 | |
| RU | 2010132245 A | 2/2012 | |
| RU | 2455208 C2 | 7/2012 | |
| WO | 2010/091043 A1 | 8/2010 | |
| WO | WO-2011072253 A1 * | 6/2011 | ............ B65B 5/024 |
| WO | 2011/085175 A2 | 7/2011 | |
| WO | WO-2012006050 A1 * | 1/2012 | ............ B65B 5/02 |
| WO | WO-2012018859 A1 * | 2/2012 | ............ B31B 50/00 |

(56) References Cited

FOREIGN PATENT DOCUMENTS

| WO | WO-2013016176 A1 * | 1/2013 | ............... B65B 5/02 |
|---|---|---|---|
| WO | 2014/113719 A1 | 7/2014 | |
| WO | 2015/020879 A1 | 2/2015 | |
| WO | 2016/014917 A1 | 1/2016 | |
| WO | 2016/053747 A1 | 4/2016 | |

OTHER PUBLICATIONS

"A Part-machine Assignment Algorithm for Cellular Manufacturing with Machine Capacity Constraints" Moussa et al., Computers Ind. Engng., 1998, vol. 35, Nos. 3-4, pp. 483-486.
"An ideal seed non-hierarchical clustering algorithm for cellular manufacturing" MP Chandrasekharan . . . —International Journal of . . . , 1986—Taylor & Francis.
"An Ideal Seed Non-hierarchical Clustering Algorithm for Cellular Manufacturing", Chandrasekharan et al., Int. J. Prod. Res., 1986, vol. 24, No. 2, pp. 451-464.
"Design for set manufacturability" RH Ahmadi, H Wurgaft—Management of Design, 1994—Springer.
"Design for set Manufacturablility", Ahmadi et al., Anderson Graduate School of Management U.C.L.A. Lose Angeles, CA 90024, 1994, Springer, pp. 123-143.
"Design of order picking system", F Dallari, G Marchet, M Melacini—The international journal of advanced . . . 2009—Springer (Year: 2009).
"Grouping and selecting products: the design key of reconfigurable manufacturing systems (RMSs)" MR Abdi, AW Labib—International journal of production research, 2004—Taylor & Francis.
"Grouping and selecting products: the design key of reconfigurable manufacturing systems (RMSs)", MR Abdi et al., Int. J. Prod. Res., 2004, vol. 42, No. 3, pp. 521-546.
"Implementing a New Corrugated Packaging Machine in a Mid Sized Manufacturing Company" Wolfe Parzyck, May 2011, Master's Thesis—University of Wisconsin-Stout (Year: 2011).
"Management of Design: Engineering and Management Perspectives" Dasu, Sriram, Eastman, Charles M., 1992, U.C.L.A. Los Angeles, CA, pp. i-277.
[PDF] An approach to order picking optimization in warehouses M Horvat—2012—core.ac.uk (as an electronic document, this is available from https://core.ac.uk/download/pdf/151477049.pdf (Year: 2012).
A mini-line approach for pull production "RH Ahmadi, H Matsuo—European Journal of Operational Research, 2000—Elsevier".
A part-machine assignment algorithm for cellular manufacturing with machine capacity constraints SE Moussa, M Kamel—Computers & industrial engineering, 1998—Elsevier.
A typology of cutting and packing problems H Dyckhoff—European Journal of Operational Research, 1990—Elsevier (Year: 1990).
Design and control of warehouse order picking: A literature review R De Koster, T Le-Duc, KJ Roodbergen—European journal of operational . . . 2007—Elsevier (Year: 2007).
Final Office Action received for U.S. Appl. No. 14/761,081, mailed on Sep. 4, 2018.
Final Office Action received for U.S. Appl. No. 15/135,059, mailed on Jul. 5, 2019.
Freezing the master production schedule under single resource constraint and demand uncertainty J Xie, X Zhao, TS Lee—International Journal of Production Economics, 2003—Elsevier. (Year: 2003).
International Search Report and Written Opinion for PCT/US2012/047562 dated Oct. 25, 2012.
International Search Report and Written Opinion for PCT/US2014/012124 dated Jun. 18, 2014.
International Search Report and Written Opinion for PCT/US2016/029476 dated Jul. 27, 2016.
International Search Report and Written Opinion, PCT/US2012/047562, U.S. International Search Authority, Date Completed Sep. 25, 2012, Date Mailed Oct. 25, 2012.
International Search Report and Written Opinion, United States Search Authority, Completed May 29, 2014, PCT/US2014/012124.
Management of Design—Engineering and Management Perspectives, (Copyrights) 1994, Dasu, Sriram; Eastman, Charles, Ed., pp. i-277.
Multi-period planning and uncertainty issues in cellular manufacturing: A review and future directions J Balakrishnan, CH Cheng—European Journal of Operational Research, 2007—Elsevier.
Office Action received for U.S. Appl. No. 14/158,731, mailed on Sep. 30, 2016.
Office Action received for U.S. Appl. No. 14/761,081, mailed on Mar. 5, 2019.
Office Action received for U.S. Appl. No. 14/761,081, mailed on Mar. 9, 2018.
Office Action received for U.S. Appl. No. 15/135,059, mailed on Apr. 15, 2020.
Office Action received for U.S. Appl. No. 15/135,059, mailed on Dec. 6, 2018.
Research on warehouse design and performance evaluation: A comprehensive review J Gu, M Goetschalckx, LF McGinnis—European Journal of Operational . . . , 2010—Elsevier (Year: 2010).
U.S. Appl. No. 14/158,731, dated Sep. 30, 2016, Office Action.
U.S. Appl. No. 15/135,059, dated Dec. 6, 2018, Office Action.
U.S. Appl. No. 15/135,059, filed Jul. 5, 2019, Final Office Action.
"Reactive GRASP for the strip-packing problem", R Alvarez-Valdes, F Parreno, JM Tamarit—Computers & Operations . . . 2008—Elsevier (Year: 2008).
A linear programming approach to the cutting-stock problem PC Gilmore, RE Gomory—Operations research, 1961—pubsonline.informs.org (Year: 1961).
Final Office Action received for U.S. Appl. No. 16/681,594, mailed on Oct. 15, 2021, 27 pages.
Knowledge based approach to the cutting stock problem Y Lirov—Mathematical and computer modelling, 1992—Elsevier (Year: 1992).
Multistage cutting stock problems of two and more dimensions PC Gilmore, RE Gomory—Operations research, 1965—pubsonline.informs.org (Year: 1965).
Non-Final Office Action received for U.S. Appl. No. 16/681,594, mailed on Jun. 15, 2021, 26 pages.
Non-Final Office Action received for U.S. Appl. No. 16/681,594, mailed on May 17, 2022, 22 pages.
Notice of Allowance Mailed on Aug. 14, 2019 for U.S. Appl. No. 14/761,081.
Notice of Allowance Mailed on Jan. 13, 2021 for U.S. Appl. No. 15/135,059.
The Max-Min Ant System applied to the rectangular pieces layout optimization R Liu, H Xu, M Zhang—2012 International Conference on . . . 2012—ieeexplore.ieee.org (Year: 2012).
Hao Zhang et al: DoraPicker: An Autonomous Picking System for general objects, Cornell University Library, 201 Olin Library Co (Mar. 21, 2016).
International Search Report and Written Opinion received for PCT Patent Application No. PCT/US2017/063988, mailed on Feb. 16, 2018, 6 pages.
Non-Final Office Action received for U.S. Appl. No. 15/825,461, mailed on Sep. 4, 2020, 36 pages.
Non-Final Office Action received for U.S. Appl. No. 17/374,774, mailed on Aug. 4, 2022, 11 pages.
Final Office Action received for U.S. Appl. No. 16/681,594, mailed on Oct. 20, 2022, 11 pages.
Final Office Action received for U.S. Appl. No. 17/374,774, mailed on Feb. 14, 2023, 16 pages.
Non-Final Office Action received for U.S. Appl. No. 16/681,594, mailed on Apr. 3, 2023, 12 pages.
Kimura Nobutaka et al: "Mobile dual-arm robot for automated order picking system in warehouse containing various kinds of products", 2015 IEEE/SICE International Symposium on System Integration (SIi), IEEE, Dec. 11, 2015 (Dec. 11, 2015), pp. 332-338.

* cited by examiner

Packaging Design Table 301

| Design Groups | Design Features (Aesthetics, Labor Prod., Cap. Ass'y, Mat'l Cost ... Protection) | | | | | | Preference Score | Options (Rotate? / Mirror? / Multiple-Outs?) | | | Restrictions | Description |
|---|---|---|---|---|---|---|---|---|---|---|---|---|
| DG₁ | Expand To Review | | | | | | | | | | | For Fragile or Sensitive Objects |
| ☑ MD₁ | Expand To Review | | | | | | | | | | | RSC Style Box |
| ☑ MD₂ | | | | | | | | | | | | Full-Size Top and Bottom Flaps Integral Corner Protectors |
| PD₁ | 2 | 4.5 | 5.1 | $0.12 | | | 42 | Yes | Yes | Yes | Max Dimension = 34 in | Dimensions A/B/C=L/W/H |
| PD₂ | 5 | 3.6 | 5.7 | $0.11 | | | 63 | Yes | No | Yes | Only Prod. Machine 8 | Dimensions A/B/C=L/H/W |
| PD₃ | 4 | 5.2 | 5.4 | $0.09 | | | 58 | No | Yes | Yes | N/A | Dimensions A/B/C=W/L/H |
| PD₄ | 3 | 3.7 | 6.1 | $0.16 | | | 51 | No | No | No | N/A | Dimensions A/B/C=W/H/L |
| PD₅ | 5 | 7.7 | 5.3 | $0.18 | | | 76 | Yes | Yes | Yes | Max L/W Ratio = 7:1 | Dimensions A/B/C=H/L/W |
| PD₆ | 3 | 6.1 | 5.4 | $0.14 | | | 89 | No | No | No | Mat'l Thickness <=.375 in. | Dimensions A/B/C=H/W/L |
| PD₇ | 5 | 5.4 | 6.2 | $0.10 | | | 55 | Yes | Yes | Yes | Mat'l Thickness <=.375 in. | with 2 vertical dividers |
| ... | | | | | | | | | | | | |
| PDₙ | 4 | 7 | 5.2 | $0.12 | | | 6 76 | Yes | Yes | No | N/A | With 2 horizontal dividers |
| ☑ MD₄ | Expand To Review | | | | | | | | | | | Two Piece Templates |
| ☑ MDₙ | Expand To Review | | | | | | | | | | | 413 Style Box |
| ☑ DG₂ | Expand To Review | | | | | | | | | | | Where High Throughput is Needed |
| ☑ DG₃ | Expand To Review | | | | | | | | | | | For High-End Customers or Products |
| ☑ DG₄ | Expand To Review | | | | | | | | | | | For Large Products |
| ☑ DG₅ | Expand To Review | | | | | | | | | | | For Compartmentalized Boxes |
| ☑ DGₙ | Expand To Review | | | | | | | | | | | For Irregular Shaped Objects |

Fig. 3

PACKAGING INFORMATION

Box Size:
- Length: ___ inches
- Width: ___ inches
- Height: ___ inches

Quantity Needed: ___  — 302a

Design Group:
- DG1 - For Fragiles or Sensitive Objects — 302b
- DG2 - Where High Throughput is Needed — 302c
- DG3 - For High-End Customers or Products — 302d
- DG4 - For Large Products — 302e
- DG5 - For Compartmentalized Boxes
- ...
- DGN - For Irregular Shaped Objects — 302f

PRODUCTION CONDITIONS
- ☒ Normal Production
- ☐ Slow Production
- ☐ Production Halted Production Time Cost: $ ___

AVAILABLE PRODUCTION MACHINES
- ☒ Machine 102
- ☒ Machine 2
- ☐ Machine 3

[SUBMIT]

User Interface 401

*Fig. 4*

PACKAGING MATERIALS TABLE — 501

| Name | Type | Width (in.) | Thickness (in.) | Quantity (in.²) | Cost (per ft.³) |
|---|---|---|---|---|---|
| A | Fanfold | 18 | 0.125 | 85000 | $0.01 |
| B | Fanfold | 30 | 0.25 | 120000 | $0.03 |
| C | Rolled | 30 | 0.25 | 12000 | $0.03 |
| D | Fanfold | 42 | 0.375 | 95000 | $0.05 |
| E | Rolled | 45 | 0.25 | 51000 | $0.04 |
| ... | | | | | |
| N | Fanfold | 108 | 0.125 | 47000 | $0.02 |

*Fig. 5A*

MACHINE DATA TABLE — 502

| Machine | Cost (per sec) | Available Mat'ls |
|---|---|---|
| M1 | $0.11 | A,B,N |
| M2 | $0.09 | A,D,N |
| M3 | $0.07 | C,E |

*Fig. 5B*

TILING PRODUCTION OF PACKAGING MATERIALS

CROSS-REFERENCE TO RELATED APPLICATIONS

This application is a divisional of U.S. patent application Ser. No. 15/135,059, entitled "Tiling Production of Packaging Materials", filed on Apr. 21, 2016. U.S. patent application Ser. No. 15/135,059 claims priority to and the benefit of U.S. Provisional Application Ser. No. 62/154,545, entitled "Tiling Production of Packaging Materials", filed on Apr. 29, 2015. Additionally, U.S. patent application Ser. No. 15/135,059 is a continuation-in-part of U.S. application Ser. No. 14/761,081, entitled "TILING PRODUCTION OF PACKAGING MATERIALS," filed on Jul. 15, 2015 which is a 371 Nationalization of PCT Application No. PCT/US14/12124, entitled "Tiling Production of Packaging Materials," filed on Jan. 17, 2014 which claims priority to and the benefit of U.S. Provisional Application Ser. No. 61/754,462, entitled "Tiling Production of Packaging Materials", filed on Jan. 18, 2013. The entire contents of each of the above applications is incorporated herein by reference in their entireties.

BACKGROUND

1. Background and Relevant Art

With the increasing availability of merchandise, products, and other items not only locally, but also through a global market, the needs to properly package such materials for shipment and delivery have never been more important. Fortunately, available packaging systems can now be used to produce virtually any style of product packaging from packaging materials such as corrugated cardboard.

Typically, users desire packaging that fits the contained product as precisely as possible. With a snugger fit, the contained item or product not only is less likely to be damaged, but the need for inner packaging is also reduced and possibly eliminated. In particular, when packaging materials such as corrugated cardboard are used to create a box or other packaging design, the materials are creased and folded as near to a right angle possible. Creasing and folding at right angles increases strength characteristics of the packaging materials (essentially exponentially), thereby giving a resulting box a correspondingly increased resistance to damage when stacked.

Many different styles of boxes may be produced to satisfy specified dimensional constraints. Each of the different styles of boxes may have different advantages or disadvantages. For instance, some styles of boxes may be more aesthetically pleasing while others may provide greater protective features. Still other boxes styles may be more rapidly produced and/or assembled, while others may require less material for production, or less material for the assembly, closing, or other manipulation of the box template.

BRIEF SUMMARY

The present invention extends to methods, machines, systems, and computer program products for optimizing dynamically assigning product groups to production machines using production groups and producing product groups at a specified ratio using production groups.

Embodiments described herein generally relate to a customizable management system for various unique packaging production architectures. The customizable management system can be configurable to universally integrate with various systems within a variety of unique packaging production architectures. For example, the customizable management system can comprise one or more importer modules that receive package creation requests and translate the requests into a second format that is readable by one or more staging and selection modules. The system may also comprise staging and selection modules that are configured to identify within each translated packaging creation order one or more final packaging parameters and identify a workgroup that is capable of meeting the one or more final packaging parameters. The system may also comprise one or more machine group modules in communication with one or more packaging stations.

Additional embodiments described herein may also generally relate to a method for configuring a packaging production architecture with a customizable management system. The method may comprise receiving, at a selection module, one or more picking line configuration scripts that comprise instructions for interacting with particular picking line architectures. The method may also comprise receiving, at a machine group module, one or more packaging production machine configuration scripts that comprise instructions for interacting with particular machine groups. Additionally, the method may also comprise generating a packaging template creation order based upon a packaging request received by an importer module and information received from the one or more picking line configuration scripts and the one or more packaging production machine configuration scripts.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates an example packaging information table.

FIG. 4 illustrates an example user-interface for accepting packaging production information.

FIG. 5A illustrates an example packaging materials table.

FIG. 5B illustrates an example machine data table.

DETAILED DESCRIPTION

Figure 1:
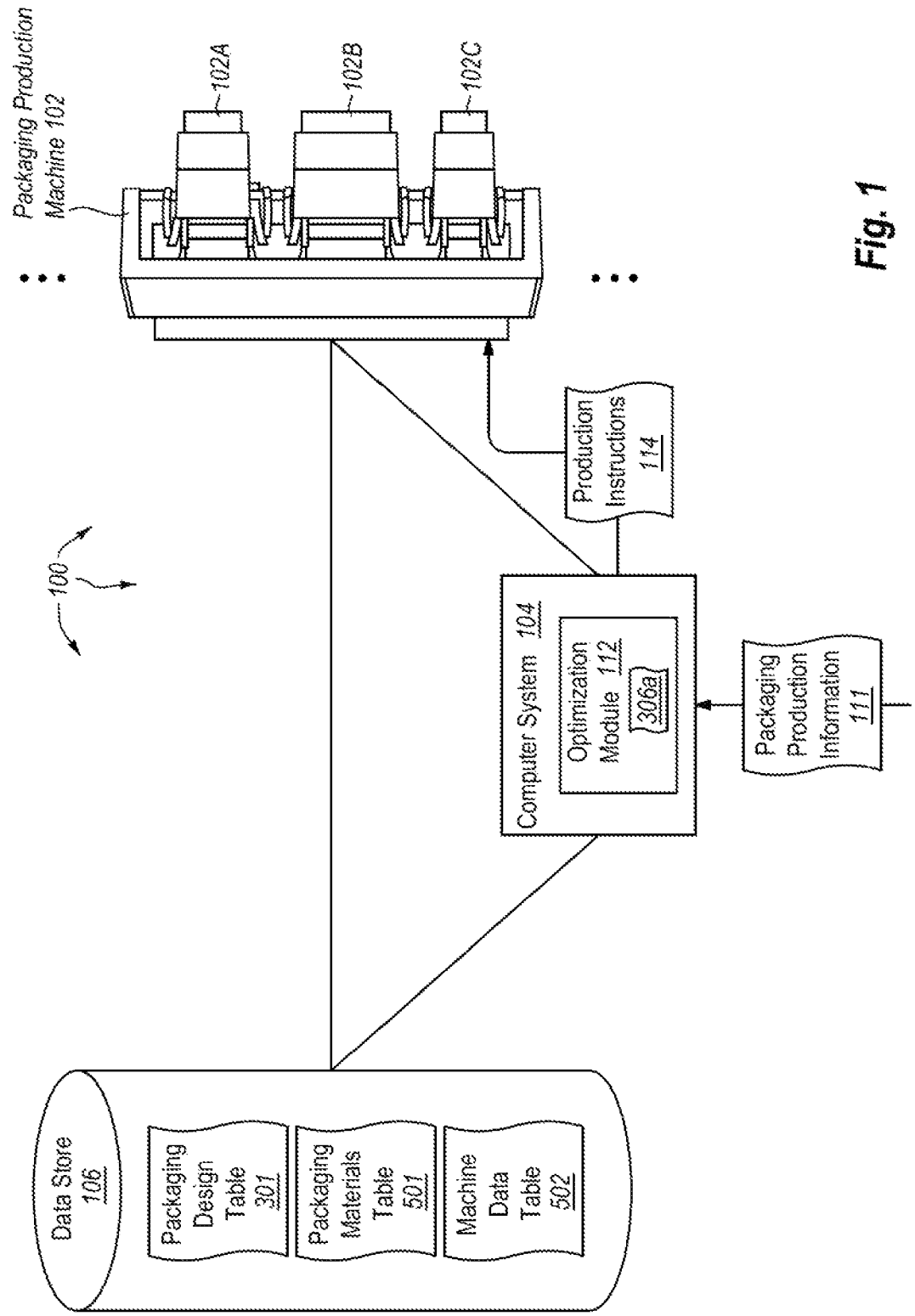
FIG. 1 illustrates an example production architecture that facilitates optimizing production of packaging products.

The present invention extends to methods, machines, systems, and computer program products for optimizing dynamically assigning product groups to production machines using production groups and producing product groups at a specified ratio using production groups.

In one embodiment, a computer system dynamically assigns at least one production entity to a product group based on various properties for that production entity. The production entity is to be produced using a production machine. The computer system then dynamically assigns each product group to any of a variety of different production groups. Each production group includes any number of production machines that are available to produce production entities for product groups that belong to the assigned production group. The computer system also indicates that at least one production entity is to be produced using the production machines in the dynamically assigned production group.

In another embodiment, a computer system dynamically assigns at least one production entity to a product group based on properties for that production entity and dynamically assigns each product group to any of a variety of different production groups. Each production group includes production machines that are available to produce production entities for product groups that belong to the assigned production group. The production group further includes a mix level per product group indicating that production entities are to be produced by product group at a ratio specified in the production group's mix level for that product group. The computer system further indicates that at least one production entity is to be produced using the production machines in the dynamically assigned production group according to the ratio specified by the product group's mix level in that production group. The computer system may also determine that the specified ratio is not being met because a first product group is being produced at a higher rate than a second product group and, as a result, may increase the number of production entities produced for the second product group to realign the established ratio.

Embodiments described herein may implement various types of computing systems. These computing systems are increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor to perform a function. A computing system may be distributed over a network environment and may include multiple constituent computing systems.

A computing system typically includes at least one processing unit and memory. The memory may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory of the computing system. The computing system may also contain communication channels that allow the computing system to communicate with other message processors over a wired or wireless network.

Embodiments described herein may comprise or utilize a special-purpose or general-purpose computer system that includes computer hardware, such as, for example, one or more processors and system memory, as discussed in greater detail below. The system memory may be included within the overall memory. The system memory may also be referred to as "main memory", and includes memory locations that are addressable by the at least one processing unit over a memory bus in which case the address location is asserted on the memory bus itself. System memory has been traditional volatile, but the principles described herein also apply in circumstances in which the system memory is partially, or even fully, non-volatile.

Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Embodiments of the invention can efficiently and automatically determine and select optimal packaging designs to produce packaging products, such as, for example, box templates. Determining and selecting packaging designs can be based on packaging product information and defined packaging designs, and in some embodiments can also be based one or more of: production machine data, packaging material data, or production environment real-time considerations. Packaging production machines can then be instructed to produce packaging products in accordance with selected packaging designs.

Embodiments of the invention can also determine an optimized arrangement of box templates within source packaging material which can, in turn, optimize one or both of the rate of box production or the efficient use of the source packaging material. For example, embodiments of the invention can tile box templates within the source packaging material, enabling a single production device to produce multiple boxes in parallel, while also minimizing waste. Optimizing the arrangement of box templates within source packaging material can occur in connection with determining and selecting optimal packaging designs, or can occur as a separate process.

FIG. 1 illustrates an example production architecture 100 that facilitates optimizing production of packaging products. Referring to FIG. 1, production architecture 100 includes packaging production machine 102, computer system 104, and data store 106. Each of the depicted components and machines is connected to one another over (or is part of) a network, such as, for example, a Local Area Network ("LAN"), a Wide Area Network ("WAN"), or even the Internet. Accordingly, each of the depicted computer systems as well as any other connected computer systems, machines, and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Packaging production machine 102 includes one or more production tracks, such as the depicted production tracks 102A, 102B, and 102C. Each of production tracks 102A, 102B, and 102C can be loaded with raw packaging materials, such as, for example, fanfold or rolled corrugated board. As depicted, each of production tracks 102A, 102B, and 102C, has a different maximum width for the raw packaging materials. As production tracks 102A, 102B, and 102C produce packaging products (e.g., box templates), packaging product machine 102 can maintain a local store of usage data. Packaging production machine 102 can include a NIC for network communication. From time to time or at desired intervals, packaging production machine 102 can communicate usage data from the local store to computer system 104 and/or data store 106 using the NIC. The vertical ellipsis above and below packaging production machine 102 represent that one or more additional packaging production machines can be included in production architecture 100.

Generally, data store 106 can store different types of information for optimizing the production of packaging products. For example, data store 106 can store information for one or more packaging production machines, such as, for example, packaging production machine 102. Stored information for packaging production machines can include packaging production machine types, cost to run packaging production machines, raw packaging material types available at packaging production machines, design groups used to optimize packaging production at the packaging production machines, etc. As depicted in production architecture 100, data store 106 more specifically includes packaging design table 301, packaging materials table 501, and machine data table 502.

Computer system 104 includes optimization module 112. Generally, optimization module 112 is configured to optimize production of packaging products. In some embodiments, optimization module 112 includes real-time packaging product design functionality. When a packaging product is to be produced, optimization module 112 can refer to data in data store 106 to determine how to optimize production of the packaging product. When optimization is determined, optimization module 112 can send instructions to a packaging production machine. The instructions instruct the packaging production machine to produce a packaging product in accordance with the determined optimization.

In some embodiments, computer system 104 and/or packaging production machine 102 utilize all or some of the information from data store 106 to optimize which types and/or sizes of packaging templates are to be made by packaging production machine 102. In some embodiments, computer system 104 and/or packaging production machine 102 also optimize which production track should be used to produce a packaging product from raw packaging materials.

Further, although packaging production machine 102, computer system 104, and data store 106 are depicted separately, components and data depicted at production machine 102, computer system 104, and data store 106 can be combined. For example, it may be that computer system 104 is physically integrated into packaging production machine 102. Similarly, data store 106 can be physically integrated into computer system 104 and/or packaging production machine 102.

In some embodiments, a packaging product is a box template. The box template can be further manipulated (e.g., folded and edges connected together) to form a box. Different types of boxes or other packaging may be used or desirable for different projects. Box size can vary based on what is being enclosed within the box. Other types of features may also be considered in determining what type and/or size box is desired for a particular use or application. Enclosing a heavy or fragile object may, for instance, dictate that a box of a certain type of material be used, or that a box that has improved protection characteristics (e.g., glue flap, integral corner protectors, full size flaps, etc.) be used.

Thus, as generally described, the components of production architecture 100 can be used to optimize production of packaging products based on any number of different features or considerations. To facilitate the use of production architecture 100 in identifying appropriate packaging for an object, any of a number of different designs or types of packaging may be considered. Each packaging type or design may have a different shape, style, or other feature. For example, one box design may have top and/or bottom flaps that are approximately half the width of the final box. For other box designs, the top and/or bottom flaps may be up to the full width of the box. These or other types of boxes may also include glue or staple flaps for assembly, have integrated corner protectors built into the top and/or bottom flaps, or have other features or any combination thereof.

Figure 2:
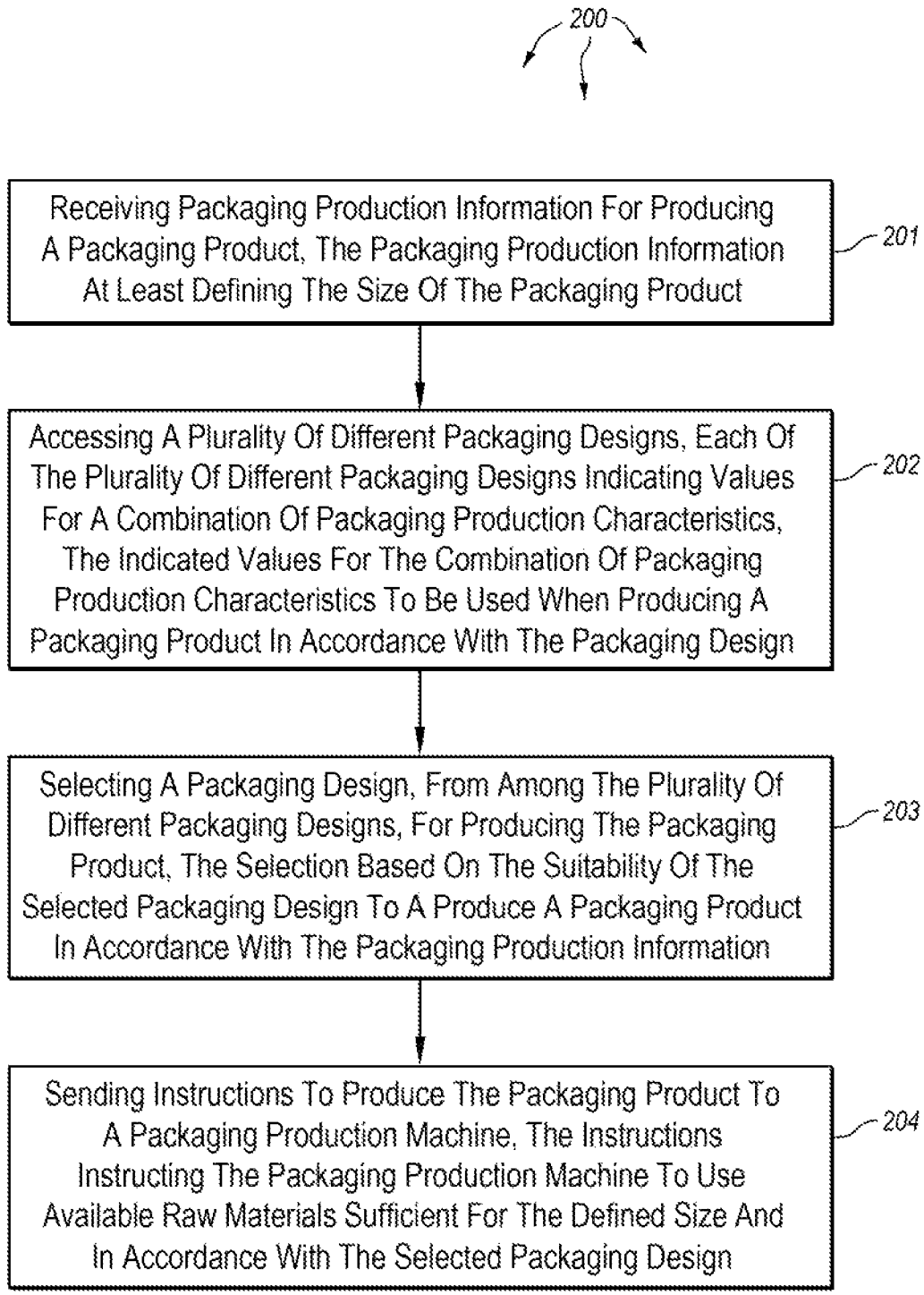
FIG. 2 illustrates a flow chart of an example method for optimizing production of packaging products.

FIG. 2 illustrates a flow chart of an example method 200 for optimizing production of packaging products. Method 200 will be described with respect to the components and data of computer architecture 100. During the description of method 200 reference will also be made to FIGS. 3, 4, 5A, and 5B.

Method 200 includes an act of receiving packaging production information for producing a packaging product, the packaging production information at least defining the size of the packaging product (act 201). For example, computer system 104 can receive packaging production information 111. Packaging production information 111 can define the size of a packaging product (e.g., a box). Packaging production information 111 can also include other information that optimization module 112 can use to determine how to optimize production of the packaging product. For example, the other information can include a quantity of boxes to produce, a selected design group, production conditions, available packaging production machines, production time cost, etc.

In some embodiments, packaging production information 111 is formulated in an automated fashion at another computer system or even within another module of computer system 104. In other embodiments, a human user enters packaging production information 111 through a user-interface, for example, provided at computer system 104 or some other network location. Referring briefly to FIG. 4, user-interface 401 depicts different user-interface controls for entering packaging production information. An operator or other user can use use-interface 401 to enter box dimensions, a quantity of boxes to produce, a design group selection, indicate production conditions, select available production machines, and indicate a production time cost. For example, through user-interface 401, a user can select design group 302a and indicate that packaging production machine 102 is available. Packaging production information entered through user-interface 401 can be included in packaging production information 111.

Method 200 includes an act of accessing a plurality of different packaging designs, each of the plurality of different packaging designs indicating values for a combination of packaging production characteristics, the indicated values for the combination of packaging production characteristics to be used when producing a packaging product in accordance with the packaging design (act 202). For example, computer system 104 can access packaging design table 301. Referring now to FIG. 3, packaging design table 301 has columns including design groups 302, design features 310, preference score 311, options 312, restrictions 308, and description 314.

Design groups 302 include a number of design groups 302a, 302b, 302c, 302d, 302e, 302f, etc. Each design group can include one or more main designs. For example, design group 302a includes main designs 304. Each main design can relate to a specified algorithm or other design that can be scored, evaluated, or otherwise related to other main designs in a corresponding design group.

A hierarchy can be established within the design groups. For example, main design 304a has multiple packaging designs 306 defined therein. Each of packaging designs 306 is related to main design 304a of which it is a part. However, each of packaging designs 306 includes at least one different value or different option in design features 310, preference score 311, options 312, and/or restrictions 308 that differentiates it from other packaging designs 306. For example, different packaging designs 306 may relate to the same main design with length, width, and height dimensions interchanged, added trays and separators within a design, or to other features or aspects common to a main design.

In some embodiments, main designs 304 can correspond to different types of boxes. For example, main design 304a can correspond to boxes having Regular Slotted Carton ("RSC") designs, full flap boxes, integral corner protection boxes, bottom lid construction boxes with separate bottom, and lid components. Other main designs 304 correspond to other types of packaging designs. Each packaging design may have one or more associated formulas that may be used to produce the design. For example, if a main design is used to produce a rectangular box, a formula may take a desired length, width and height for the assembled box. Based on the main design, a box template is produced. The box template can be folded to produce the box of the particular length, width and height, and which also offers the other characteristics or features of the particular main design.

Thus, the various packaging designs 306 can be considered as sub-designs within main design 304a. Each of packaging designs 306 can use a similar, or even essentially the same, formula with some variation.

When appropriate, computer system 104 can also access one or more packaging materials table 501 and machine data table 502. Referring to FIG. 5A, packaging materials table 501 indicates aspects of one or more packaging materials that are available within production architecture 100, some of which may be available at packaging production machine 102. For example, packaging materials table 501 indicates packaging material aspects, such as, for example, name, type, width, thickness, quantity, and cost.

Referring to FIG. 5B, machine data table 502 indicates aspects of one or more packaging production machines in production architecture 100, including packaging production machine 102. For example, machine data table 502 indicates packaging production machines including name, associated operational cost (e.g., relative cost for each second that is required to produce a packaging product), availability of different packaging materials, etc.

Method 200 includes an act of selecting a packaging design, from among the plurality of different packaging designs, for producing the packaging product, the selection based on the suitability of the selected packaging design to produce a packaging product in accordance with the packaging production information (act 203). For example, optimization module 112 can select packaging design 306a based on the suitability of packaging product design 306a to produce a packaging product (e.g., a box template) in accordance with packaging production information 111. The contents of packaging materials table 501 and/or machine data table 502 can also be considered when selecting packaging design 306a. Any number of different algorithms considering packaging design table 301 and one or more of packaging materials table 501 or machine data table 502 can be used for packaging design selection.

In some embodiments, an algorithm processes one or more values and/or options from packaging design table 301 and one or more values and/or options from packaging materials table 501 and/or from machine data table 502 to generate score values for different packaging designs. Based on the generated score values, optimization module 112 can select a packaging design.

Method 200 includes an act of sending instructions to produce the packaging product to a packaging production machine, the instructions instructing the packaging production machine to use available raw materials sufficient for the defined size and in accordance with the selected packaging design (act 204). For example, computer system 104 can send production instructions 114 to packaging production machine 102. Packaging production instructions 114 instruct packaging production machine 102 to use raw materials sufficient to create a packaging product of the size defined in packaging production information and to create the packaging product in accordance with packaging design 306a.

Figure 6:
FIG. 6 illustrates a flow chart of an example method for selecting a design for a packaging product.
Figure 7:
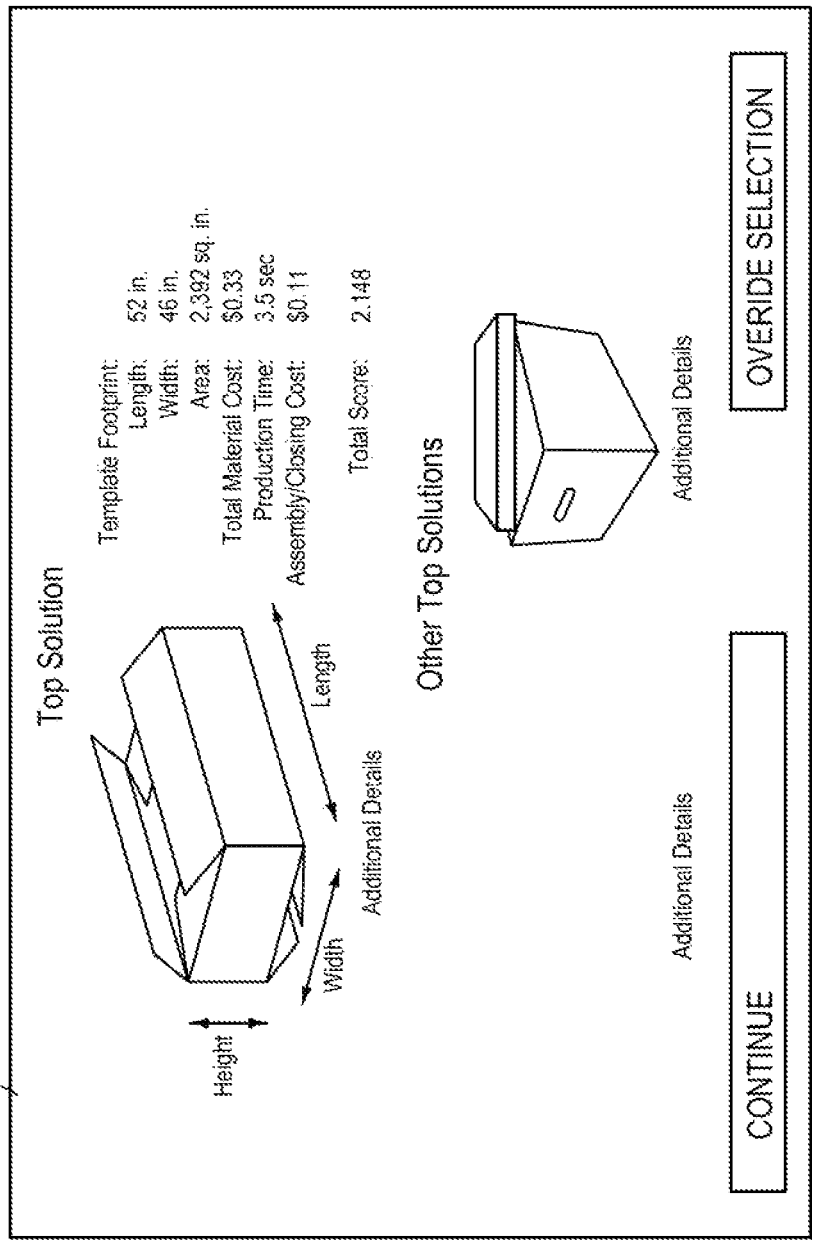
FIG. 7 illustrates an example user interface for presenting packaging designs.

Other embodiments of the invention include establishing packaging information and then using the established packaging information to select a packaging design. FIG. 6 illustrates a flow chart of an example method 600 for selecting a design for a packaging product. Method 600 will be described with respect to FIGS. 3, 4, 5A, 5B, and 7.

Method 600 includes an act of defining design groups (act 601). For example, with reference to FIG. 3, design groups 302 can be defined. Design groups 302 can relate generally to sets of different weights, preferences, restrictions, and other considerations, or combinations of the foregoing, that a user, operator, customer, or other person or entity places on a particular design. For example, different design groups may be designed for use with different products, different types of products (e.g., fragile vs. non-fragile, expensive vs. inexpensive, etc.), different customers, and the like.

Method 600 includes an act of setting up a hierarchy within design groups (act 602). For example, each design group 302 can be set up with one or more different main designs 304. Each main design 304 can relate to a particular algorithm or other design that may be scored, evaluated, or otherwise related to other main designs 304 within design group 302. Each main design 304 can also be set up with one or more packaging designs. For example, main design 304a includes packaging designs 306.

Setting up a hierarchy within design grouped can include assigning values for one or more of design features 310, preference score 311, options 312, restrictions 308, or description 314 for each packaging design. Thus, each packaging design 306 is related to main design 304a, but includes various different options. Accordingly, the various packaging designs 306 may be considered as sub-designs within main design 304a, and can use the same formula—or essentially the same formula—but with some variation. For example, different packaging designs 306 can relate to the same main design with length, width, and height dimensions interchanged, added trays and separators within a design, or to other features or aspects common to main design 304a.

In some embodiments, setting up a hierarchy includes establishing main designs that correspond to different types of boxes. For example, some of main designs 304 may correspond to boxes having RSC designs, full flap boxes, integral corner protection boxes, bottom lid construction boxes with separate bottom and lid components. Other of main designs 304 correspond to other types of packaging designs. Each packaging design may have one or more associated formulas that may be used to produce the design. For example, if a main design is used to produce a rectangular box, a formula may take a desired length, width and height for the assembled box, and then produce a box template that can be folded to produce the box of the particular length, width and height, and which also offers the other characteristics or features of the particular main design.

In some embodiments, a single type of packaging may be produced by using the desired length, height, and width of the desired box. There are, however, up to six different combinations that may be obtained simply by varying the length, width, and height values. Thus, if a user inputs length, height, and width values, the various packaging designs 306 may relate to different combinations (e.g., using the length as the height, the height as the width, and the width as the length). A user can input the dimensions in one way and then optimization module 112 can evaluate the dimensions in six different combinations. For example, a box may have the following dimensions:

Dimension 1: 12 inches
Dimension 2: 18 inches
Dimension 3: 14 inches.

This same box may also be described in any of the following manners:

Length/Width/Height:
A: 12 in by 18 in by 14 in
B: 12 in by 14 in by 18 in
C: 18 in by 12 in by 14 in
D: 18 in by 14 in by 12 in
E: 14 in by 12 in by 18 in
F: 14 in by 18 in by 12 in Ultimately, any of these combinations of the same dimensions may be used to produce a box that has the same overall dimensions (namely 12 inches by 18 inches by 14 inches). However, as the dimensions are input into a formula in a particular form, the size and shape of the two-dimensional template that may be folded to produce the box of the specified size may be varied. In some cases, the width and length of the template can change based on the particular combination of length/width/height dimensions. Particularly where a packaging production machine has access to a limited set of types of materials (e.g., fanfold or rolled corrugated board of particular widths), the size of the template may make a difference in the overall cost to produce the box. The different dimensional combinations may also affect the amount of materials used to assemble or close the box, the time to assemble the box, the difficulty in assembling the box, and the like. For example, boxes of different dimensions may require different amounts of glue or other adhesives, staples, strapping bands, or other materials used to prepare, erect, mark, and/or close a box.

To illustrate, entered dimensions for a first box template can be about 50 inches wide and about 64 inches long. Entered dimensions for a second box template can be about 80 inches wide and about 40 inches long. Thus, the total area of both the first box template and the second box template are 3200 in$^2$. A packaging production machine may have access to fanfold or rolled production materials that are 55 inches wide and 100 inches wide. Thus, even though the overall areas are the same, more packaging materials may be necessary to produce the second box template.

For example, if the second box template is produced from the 100 inch wide material, 4000 in$^2$ (i.e., 100 inches by 40 inches) of production materials are used to produce the second box template. If the second box template is rotated and produced from the 55 inch wide fanfold, 4400 in$^2$ (i.e., 55 inches by 80 inches) of production materials are used to produce the second box template. In contrast, the first box template may be produced from the 55 inch wide material, such that the total material used is 3520 in$^2$ (i.e., 55 inches by 64 inches).

Accordingly, changing the manner in which dimensions are input to produce a same type of box may have an impact on the box or the cost to produce a box. Entered dimensions can also affect other aspects of packaging production. For example, the structural strength of a box may also change (e.g., by changing the length of a glue/staple flap), the difficulty of assembly may increase, the overall aesthetic appearance of the box may change, or a number of other characteristics or features may change based solely on which dimensions are used as the length, width, or height. Moreover, other changes to a main design 304 may also be addressed within a sub-design (e.g., adding inserts or dividers to a tray or within a box).

Setting up a hierarchy within design groups can also include specifying one or more design features 310, such as, for example, aesthetics, labor, production capacity, assembly/material costs, and protection for each packaging design. Setting up a hierarchy can also include specifying a preference score 311 for each packaging design Setting up a hierarchy within design groups can also include specifying options 312 for each packaging design. For example, options 312 can be specified to indicate whether a design may be rotated, mirrored, and have multiple outputs for a particular packaging design 306 or main design 304. In general, rotated or mirrored versions of a main design (or of a particular packaging design) may have generally the same overall two-dimensional template dimensions of a corresponding design. There can advantages to a rotating a design. For example, packaging materials (e.g., fanfold or rolled corrugated materials) may be available in only certain widths. A template that is 60 inches wide by 40 inches long may thus be produced by fanfold material that is 75 inches wide. However, by rotating the template, the same design may be produced using fanfold material that is 42 inches wide, thereby reducing the overall material usage in production of the template.

For packaging designs 306 with multiple outs enabled (e.g., $PD_1$, $PD_2$, $PD_3$, $PD_5$, and $PD_7$, as shown in FIG. 3), multiple templates may be produced side-by-side (or "tiled") within the production material. That is, substantially the entire width of production materials (e.g., fanfold corrugated board) can be used to produce a plurality of (e.g., two) packaging products (e.g., box templates) essentially or entirely in parallel. Enabling multiple outs may allow multiple identical designs to be produced side-by-side, or may even allow different designs to be produced side-by-side.

Tiling packaging products to produce the packaging products in parallel can greatly increase the speed and efficiency with which packaging products are produced, and can help maximize utilization of limited packaging production machine hardware. Furthermore, using substantially the entire width of production materials greatly reduces, and can potentially eliminate, waste of production material. Producing multiple templates side-by-side is discussed in greater detail in reference to at least FIGS. 8 and 9.

In the foregoing description, particular mention is made of the size of fanfold or other packaging material and/or the dimensions of packaging and/or packaging templates. It should be appreciated that these dimensions are merely exemplary and are provided to illustrate example circumstances in which different variations of a design may be used. In packaging design table 301, no dimensions are included for design groups 302, main designs 304, or packaging designs 306. While this is merely optional, the exclusion of dimensions may allow for a broader range of packaging to be considered.

For example, instead of defining a design group for each product size or each possible packaging size, a definition similar to that in packaging design table is more robust and allows product types to be assigned for each design group 302. Each main design 304 and packaging design sub-group 306 may have a formula for calculating the size of the packaging template such that a wide range of packaging sizes may be evaluated. Moreover, in some embodiments, one design group may be within the hierarchy of another design group. For instance, by selecting one design group, one or more other design groups and the main and/or packaging designs 304, 306 therein may also be considered.

In some embodiments, a user or computer system assigns values for restrictions 308 for a design group. Method 600 includes an act of assigning restrictions/constraints (act 603). In packaging design table 301, main designs 304 or packaging designs 306 can assign restrictions and/or constraints (e.g., restrictions 308). For example, a packaging design be assigned a size restriction (e.g., maximum dimension must be less than 34 inches). In this particular example, a packaging design may allow for any dimension to be up to a specified value. If the dimension exceeds the specified value, there is a possibility that the template may not be producible by a desired packaging production machine, that it will be produced with undesired crease lines, or have some other feature, or a combination thereof.

Any type of constraint or restriction can be assigned. For example, absolute size or dimensional restrictions may be applied, relative size or dimensional restrictions may be applied (e.g., length to width ratio must be less than 7:1). Restrictions or constraints may limit or require a particular packaging production machine be used to produce the design, or that a particular quality of fanfold material be used. Of course other considerations can be used in identifying restrictions or constraints. Thus, a restriction or constraint may be used to specify conditions that, when existing, exclude the particular design from further consideration or use.

In some embodiments, a user or computer system assigns a value for preference score 311 or for other priorities or costs for a design group. Method 600 includes an act of assigning preferences/priorities/costs (act 604). Preferences or priorities may be assigned in any of a number of different categories. For example, in packaging design table 301, preferences or priorities may be assigned to design features 310. Example design features that may be used in setting preferences, priorities, costs, and the like include aesthetic appearance, labor time, production capabilities, assembly/closing material costs, protective capabilities, or other preferences, or combinations thereof.

One or more (possibly all) combinations of values for design related features 310 can be weighted. Values can be weighted and assigned automatically, or can be assigned by an engineer or other user, operator, or person knowledgeable of the system described herein. For example, each different design feature may be weighed differently. If a particular design group 302 is likely to be used with fragile or heavy objects, the protective abilities of the box may be particularly important. On the other hand, if a design group 302 is to be used for expensive products or high-end customers, aesthetic appearance may be particularly important. For high volume products, the labor time, production capabilities, assembly material costs, and the like can be valued highly.

Accordingly, each design group 302 can be considered by weighting the different design-related features 310 in any number of different manners. Moreover, the different design groups 302 can have different types of main designs 304 and packaging designs 306 considered. For example, some design groups 302 may not consider boxes with integral corner protectors (e.g., for products that do not need any additional protection or which are oddly shaped), while only some design groups 302 may consider templates that are produced in two or more separate parts (e.g., a design group 302 for large products). Thus, each design group 302 may be customized not only in the manner in which the features 310 are evaluated and weighed, but in what main designs 304 and/or packaging designs 306 are included as options within the particular design group 302.

A number of different design features 310 and a preference score 311 are expressly depicted in packaging design table 301. Some packaging designs may not be assigned a value for each of design features 310 and/or for preference score 311. In some embodiments, none of design features 310 are assigned values. Thus, the value for preference score 311 may be a single value assigned to a particular design. The value for preference score 311 can be based on a particular combination of design related features deemed important for the design group. The preference value may be a numerical value (e.g., on a scale of 0 to 100), a letter value (e.g., a value between A and F), a cost value (e.g., an associated cost to produce the box based on the design factors 310), or any other type of value, or a combination thereof.

Method 600 includes an act of setting up additional information (act 605). For example, referring again to FIGS. 5A and 5B, packaging materials table 501 and machine data table 502 can also be set up. Packaging materials table 501 can be set up to describe aspects of the one or more packaging materials that are available within production architecture 100. For example, packaging materials table

501 describes aspects of packaging materials such as the widths of fanfold production materials that are available, the available quantities of such fanfold materials, and the cost of each type of material. Machine data table 502 can be setup to describe aspects of one or more packaging production machines that are available within production architecture 100. For example, machine data table 502 describes aspects of packaging production machines such as cost per second to operate (operation cost) and access to different packaging material sizes.

Embodiments of the invention include a real-time design optimization system that uses the available information to select or identify one or more optimal packaging designs. Based on design information, packaging material information, and packaging production machine information, a design for a packaging product can be selected. The real-time design optimization system can also consider further user entered job specific information (e.g., from an operator) to facilitate design selection.

Method 600 includes an act of inputting job specific information (act 606). For example, turning briefly again to FIG. 4, the real-time design optimization system can consider job specific information entered through user-interface 401. Job specific information can indicate a job for a single box, multiple identical boxes, or multiple different boxes. When entering information at user-interface 401, an operator or other user may input information such as the design group that is to be used. As noted above, each design group may include different types of packaging designs.

Additionally, or alternatively, each design group may weight different design-related features in a different manner. For instance, as depicted in user-interface 401 one or more design groups 302 identified along with a basic description of that design group. The description may include size, weight, product category, or other information that an operator may use to identify what design group is to be considered. In some embodiments, multiple design groups are selected by the user for consideration.

Method 600 includes an act of updating information (act 607). For example, user-interface 401 depicts various fields in which the user may enter dimensional information. An operator may know, for example, that a desired box has dimensions A, B and C, in which case such dimensions may be entered into the appropriate fields of user-interface 401. The dimensional information may be entered in a number of different units as well. For example, the system may request the dimensions in inches, feet, centimeters, meters, or other dimensions. The user may also be able to specify the units in which the specified value is input. For instance, a dropdown box may allow the user to specify that the units are provided in inches rather than centimeters.

Other information can also be input. For example, at user-interface 401, an operator or other user can enter information about production conditions. If an incident has occurred that has slowed or stopped production, this condition may be entered. A check box or other input mechanism can be used to indicate that production has stopped or slowed. User-interface 401 can also be used to input a time cost. The time cost can be increased as production stops or slows. As described, the time cost can be used to evaluate production time. For high production costs, a real-time optimization system can look for solutions that reduce production time. Additional information may also be input. For example, additional information about the availability of fanfold or other production materials, identification of production machines that are offline, or other information, or combinations thereof, may also be specified.

Method 600 includes an act of identifying approved design solutions (act 608). For example, a real time design optimization system can consider dimensional information and other information specified by a user in view of design restrictions to evaluate each main design in a specified design group. Designs that can satisfy user entered information in view of design restrictions are identified as approved design solutions. A list of approved solutions can be displayed to a user and/or stored (e.g., in data store 106).

A real time design optimization system can evaluate the restrictions or other constraints specified for any design in the design group. If, for example, a design has a restriction that is not satisfied (e.g., size restriction, dimensional restriction, packaging production machine limitation, material quality limitation, etc.), that design can be excluded from a list of available possible solutions. Other restrictions or constraints can also be evaluated. For example, additional restrictions may relate to availability of fanfold or production machines (e.g., can only be produced on a particular machine), time costs (e.g., only use if the time cost is below a certain value or between certain values), or based on other factors, or any combination of the foregoing.

Method 600 includes an act of calculating material cost (act 609). For example, a real time design optimization system can identify fanfold widths that are available at packaging production machines (e.g., at packaging production machine 102). For each approved solution, the real time design optimization system can calculate the amount of fanfold material used to produce the design. The amount of fanfold material used can be based not solely on the footprint of the packaging template, but on the overall usage of fanfold material based on the fanfold width.

Accordingly, a packaging template measuring 50 inches wide by 30 inches long may have an area of 1500 $in^2$. If, however, the packaging template is produced from fanfold that measures 60 inches wide, the overall material usage may be 1800 $in^2$. A rotated version of the same design could potentially be produced from fanfold measuring 32 inches wide, such that the rotated version may be produced using approximately 1600 $in^2$ of fanfold material. Thus, calculating the material cost may also include considering the available materials available to the packaging production machines, including their different sizes, qualities, and quantities.

With the fanfold material usage known, a cost can be calculated. For example, for fanfold material having a cost of $0.03 ft2, the overall cost of 1600 $in^2$ of fanfold material may be about $0.33. The overall cost of 1800 $in^2$ of fanfold material may then be about $0.38. Accordingly, based on the different widths of fanfold material available, and the various main designs 304 and sub-designs 306 within a design group 302, a number of different costs may be obtained for fanfold material. Furthermore, different fanfold material widths may have different associated costs. For instance, quality of fanfold may vary such that the cost of one fanfold material is higher relative to another (e.g., cost per square foot varies for different fanfold). In other embodiments, the producer may want to close-out a particular width of fanfold so that a lower cost may be assigned to such fanfold material.

The amount of material used to produce a design—and thus the material cost for a box or other package—can be a factor in determining what box to produce. However, other factors can also be considered. For example, as described, each main or packaging design 304, 306 within a design group 302 may have particular values or preferences assigned based on design-related features 310. Accordingly, a real time design optimization system can consider a number of the design-related features before identifying an optimal design.

For example, a box template produced with lower material cost may nonetheless have costly assembly/closing materials, or a high labor cost associated with assembly the box. These and other factors can outweigh the lower material cost, resulting in selection of an alternative design. In other embodiments, the low material cost design may also have poor aesthetic or protective capabilities. As a result, when a real time design optimization system evaluates the various aspects, a design group with a high weight or preference to aesthetic qualities and/or protective qualities may also outweigh the lower relative material cost of one design over another.

Method 600 includes an act of assigning preferences scores (act 610). For example, a real time design optimization system can assign a preference score for each approved solution from act 608. Method 600 includes an act of combining preference score and material cost (act 611). For example, a real time design optimization system can combine calculated material costs from act 609 with assign preference scores from act 610.

Any desired algorithm for combining a preference score and material cost, or otherwise producing the score value may be used. For example, a set of approved design options may include the following values and material cost values as depicted in Table 1:

TABLE 1

|  | Preference Value | Material Cost |
| --- | --- | --- |
| Design 1 | 83 | $0.36 |
| Design 2 | 44 | $0.24 |
| Design 3 | 60 | $0.28 |
| Design 4 | 85 | $0.27 |
| Design 5 | 92 | $0.34 |
| Design 6 | 68 | $0.30 |
| Design 7 | 71 | $0.30 |
| Design 8 | 56 | $0.28 |
| Design 9 | 75 | $0.35 |
| Design 10 | 77 | $0.33 |

The Preference Values and Material Cost values for each design may then be combined in a manner that produces an overall score. According to one example, the preference and material cost values may be normalized and given equal weight in computing the preference score. For example, the preference value for each design may be normalized by dividing each value by the maximum Preference Value. Thus, Design 5 may obtain a normalized Preference value of 1.00.

The Material Cost values may also be normalized. For example, the material cost value for each design may be normalized by dividing each value by the minimum Material Cost value. Thus, Design 2 may obtain a normalized Material Cost value of 1.00. If an assumption is made that a value having twice the cost as Design 2 has a normalized value of 0.00, then the normalized value may be obtained by the equation:

$$NMCV = MCV * \frac{-1}{MMCV} - 2$$

where:
NMCV is the Normalized Minimum Material Cost Value;
MCV is the Material Cost Value; and
MMCV is the Minimum Material Cost Value.

The normalized preference values and material cost values can then weighted equally and summed. With the designs sorted by Score Value Table 2 depicts score values for the designs form Table 1:

TABLE 2

|  | Normalized Preference Value | Normalized Material Cost | Score Value |
| --- | --- | --- | --- |
| Design 4 | 0.924 | 0.875 | 1.799 |
| Design 5 | 1.000 | 0.583 | 1.583 |
| Design 7 | 0.772 | 0.750 | 1.522 |
| Design 6 | 0.739 | 0.750 | 1.489 |
| Design 3 | 0.652 | 0.833 | 1.486 |
| Design 2 | 0.478 | 1.000 | 1.478 |
| Design 10 | 0.837 | 0.625 | 1.462 |
| Design 8 | 0.609 | 0.833 | 1.442 |
| Design 1 | 0.902 | 0.500 | 1.402 |
| Design 9 | 0.815 | 0.542 | 1.357 |

Accordingly, in Table 2, it can be seen that Design 4 has the highest Score Value according to the particular combination of material costs and preference values assigned in the selected Design Group. The used preference values may be based on one or more algorithms or considerations that place different weights, preferences or priorities on different design features 310. Moreover, the described normalization method is merely one mechanism for computing a score value based on a preference value and a material cost.

In other embodiments, the preference and/or material costs may be normalized, weighted, or otherwise used, or a combination of the foregoing, in other manners. For example, a preference value can be translated into a direct cost that may be added to the material cost such that the material cost need not be normalized. In another embodiment, the material cost is normalized based on a difference between the maximum and minimum costs, rather than on the minimum material cost. In still other embodiments, different calculations, algorithms, normalizations, and/or other factors, or a combination thereof may be considered.

Method 600 includes an act of identifying top solutions (act 612). For example, a real time design optimization system can identify top solutions from Table 2. Thus, it may be that the score values from Table 2 are used to limit the number of solutions for additional or final consideration. Further, a design group 302 may include a number of different main designs 304 and a number of packaging designs 306 as sub-designs within a main design 302. Indeed, there may easily be dozens, if not hundreds or thousands, of possible options that may be scored and considered. Thus, the score value is used to identify a top set of solutions, such as, for example, the top ten solutions. From Table 2, the top seven solutions can be identified, although more or fewer than seven or ten solutions may also be identified as the top solutions.

Whether or not a number of top solutions are identified, a real time design optimization system may then choose one design to use for producing a packaging product. In some embodiments, the chosen design is selected based exclusively on the score value. In other embodiments, the top solutions may be provided to an operator via a user interface to allow the user to select the chosen design. The user interface can also indicate the relative score values and potentially the calculations or basis of the score value calculation.

In further embodiments, the identified top solutions are further processed to further refine the list of top solutions. For example, the top solutions can further be evaluated based on production time. As noted herein, production time may be particularly important in some industries and/or at certain production times. During a busy production system, packaging production machines may create a bottleneck such that reducing the production time will allow greater throughput. In other times, a production slow-down or stoppage may also create a production backlog that increases the importance of production time. In still other cases, production machines may have excess capacity available such that production time is of little or no concern.

Method 600 includes an act of simulating production time (act 613). For example, a real time design optimization system can simulate production time for top solutions identified in act 612. In some embodiments, simulating production times is based on knowledge the real-time design optimization system maintains about the one or more production machines. Production time can be simulated for top solutions or all solutions based on resource requirements for corresponding calculations.

Depicted in Table 3, the top seven of the previously identified ten designs have been selected for processing by simulating the production time. While the following table includes the production time, an associated cost may additionally or alternatively be used. For example, if different machines are used and have different associated costs, the production value may be a cost value associated with the particular machine on which the design template will be produced.

TABLE 3

|  | Normalized Preference Value | Normalized Material Cost | Production Time |
| --- | --- | --- | --- |
| Design 4 | 0.924 | 0.875 | 3.1 |
| Design 5 | 1.000 | 0.583 | 2.75 |
| Design 7 | 0.772 | 0.750 | 2.45 |
| Design 6 | 0.739 | 0.750 | 2.77 |
| Design 3 | 0.652 | 0.833 | 2.9 |
| Design 2 | 0.478 | 1.000 | 2.8 |
| Design 10 | 0.837 | 0.625 | 2.55 |

Method 600 includes an act of combining production time with preference score and material cost (act 614). For example, a real time design optimization system can combine production times from act 613 with preference scores from act 610 and material costs from act 609. Production time can be normalized in a manner similar to that shown above for normalizing the material cost (i.e., such that Design 7 has a value of 1.00 and a design taking twice as long to produce would have a normalized value of 0.00). Table 4 depicts Total scores for the Top seven designs from Table 1. Total score can weight preference value, material costs, and production time equally.

TABLE 4

|  | Normalized Preference Value | Normalized Material Cost | Production Time (s) | TOTAL SCORE |
| --- | --- | --- | --- | --- |
| Design 4 | 0.924 | 0.875 | 0.735 | 2.534 |
| Design 7 | 0.837 | 0.625 | 1.000 | 2.462 |
| Design 5 | 1.000 | 0.583 | 0.878 | 2.461 |
| Design 10 | 0.478 | 1.000 | 0.959 | 2.437 |

TABLE 4-continued

|  | Normalized Preference Value | Normalized Material Cost | Production Time (s) | TOTAL SCORE |
| --- | --- | --- | --- | --- |
| Design 6 | 0.772 | 0.750 | 0.869 | 2.391 |
| Design 2 | 0.652 | 0.833 | 0.857 | 2.343 |
| Design 3 | 0.739 | 0.750 | 0.816 | 2.305 |

As shown Table 4, Design 4 has been given the highest overall score, while of the top designs, Design 3 has the lowest overall score. The values obtained for the score can be based on a sum of normalized values; however, average scores, cost values, weighted sums, or other algorithms or manners for computing a total score may be used.

Method 600 includes an act of eliminating doublets (act 615). For example, a real time design optimization system can eliminate doublets from the designs in Table 4. The real time design optimization system can further refine and/or process scores and designs to identify those designs that are at least significantly similar and potentially alike in all significant aspects. For example, if any designs have identical or very similar Preference Values, Material Costs, and/or Production Times, all but one of such similar designs (i.e., doublets) can be eliminated. Additionally, or alternatively, consideration of doublets for elimination may include evaluating other aspects, including the type of design (e.g., RSC full flap, integrated corner protectors, bottom lid, etc.) or other aspects.

Method 600 includes an act of identifying top solutions (act 616). For example, a real time design optimization system can identify the top solutions from Table 4 (either with or without doublet elimination). For example, the highest scoring design may be selected and transferred for production. Alternately, a top number of designs (e.g., top 5 designs) can be selected. If a top number of designs is selected, any number may be used. For example, more or fewer than 5 designs may be selected as the top number of designs.

Method 600 includes an act of selecting a design for production (act 617). For example, a real time design optimization system can select a design for production at packaging production machine 102. In some embodiments, a real time design optimization system automatically transfers the top scored design for production. In other embodiments, however, an operator may be notified of the top number of designs, or optionally of all or some other number of designs. For example, referring to FIG. 7, user-interface 701 gives an operator or other user the option to choose a design from among the top designs.

If the top three designs are provided to the operator, the operator can choose to do nothing, thereby resulting in a top scored design being transferred for production. The operator may actively select that the operator is not overriding the choice, or after a specified time without operator selection, the top design may be transferred to the packaging production machine for operation. Alternatively, if the operator desires a different design to be transferred for production, the operator may select one of the other options (e.g., the designs ranked as the top second through fifth) designs. In still another alternative, the operator may indicate that no solution is desired and the operator can select a different available design (e.g., one of the previously scored but not top designs).

As further depicted in user-interface 701, pictures of the assembled box, box template, or some other image may be used to graphically illustrate the various available boxes. In other embodiments, boxes are identified by information or name only. Accordingly, it should be appreciated that it is not necessary that an image of a box or template be provided to the operator.

Accordingly, embodiments of the invention include automatically optimizing production of packaging products based on stored and/or real-time information. In some embodiments, a request for a packaging product is received and a real-time design optimization system accesses information about one or more design groups. The one or more design groups include multiple design options. The multiple design options are scored based on stored and/or real-time criteria. Based on the score, one or more top designs are identified for production and/or selection by an operator of the system.

As was mentioned previously, embodiments of the invention also include producing multiple templates (e.g., box templates) side-by-side (or tiled) within source production material. That is, the production architecture 100 can facilitate production of two or more templates substantially in parallel on each production track (e.g., production tracks 102A, 102B, and 102C). Tiling templates during production can be performed a part of automatically optimizing production of packaging products based on stored and/or real-time information, as discussed above. For example, packaging design table 301, or a separate data structure, can contain information about possible combinations and arrangements of design groups 302, main designs 304, and/or packaging designs 306 that can be tiled together. This information can be used by optimization module 112 when selecting suitable packaging designs. Alternatively, tiling templates during production can be performed as a separate process.

Figure 8:
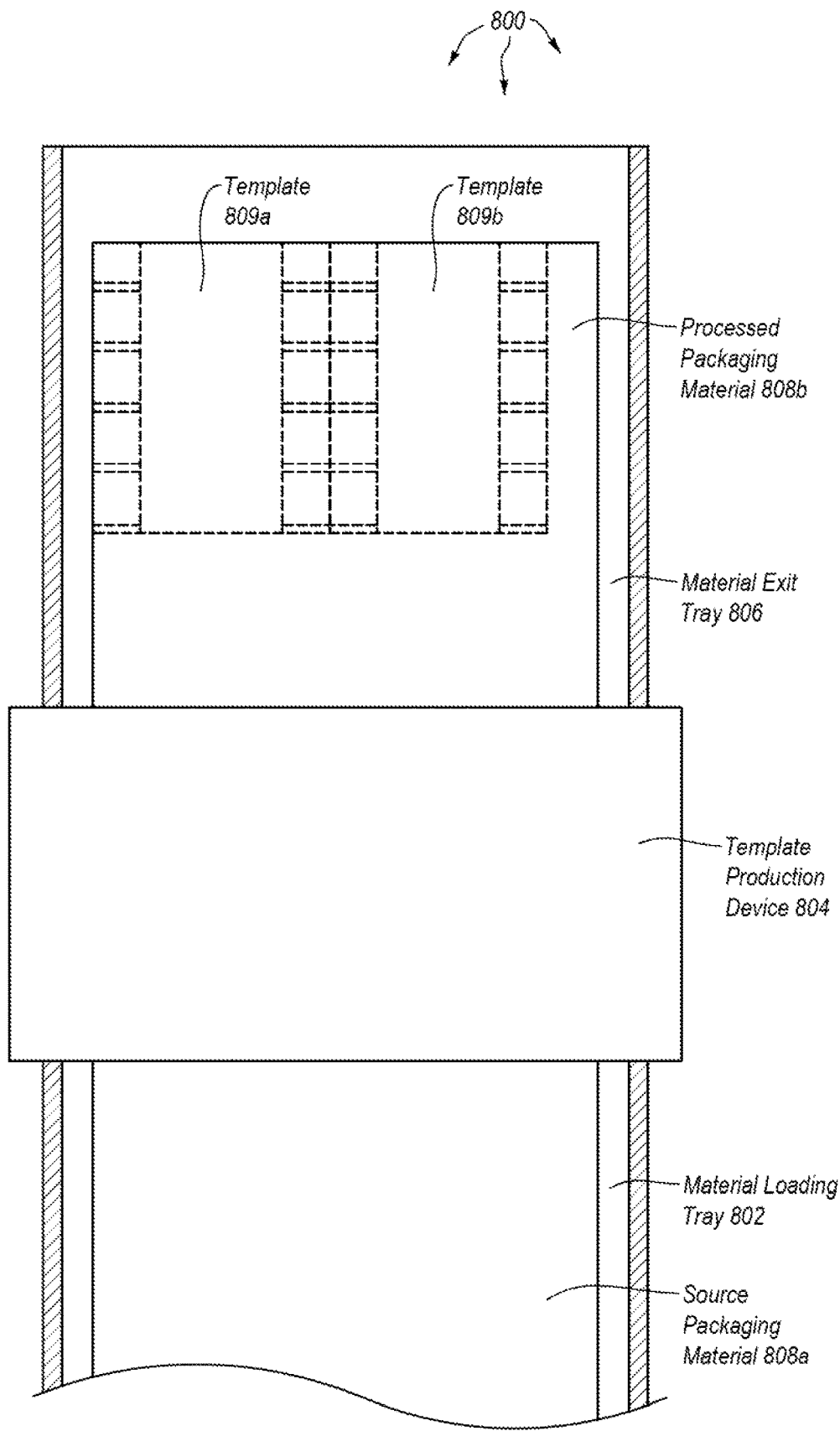
FIG. 8 illustrates an example a production track configured to produce tiled templates within source production material.

FIG. 8 illustrates an embodiment of a production track 800 that is configured to produce tiled templates within source production material, in accordance with one or more embodiments. Production track 800 may represent one or more of production tracks 102A, 102B, 102C of FIG. 1, for example.

As depicted, production track 800 includes material loading tray 802, template production device 804 (e.g., a configurable cutting or stamping device), and material exit tray 806. Production track 800 is configured to receive source packaging material 808a at material loading tray 802 and to feed the source packaging material 808a into template production device 804. Source packaging material 808a is typically fanfold or rolled corrugated board, but could also comprise other packaging materials, such as plastic, vinyl, or other materials suitable for creating packaging products.

Template production device 804 is configured to follow instructions (e.g., production instructions 114 as generated by computer system 104) to stamp and/or cut templates for packaging products (e.g., boxes) into the source packaging material 808a. For example, production track 800 is depicted as having output, onto material exit tray 806, processed packaging material 808b that includes two packaging templates 809a and 809b in a tiled or side-by-side configuration. In doing so, production track 800 has thus produced, in the illustrated embodiment, two box templates in parallel, while greatly reducing the amount of waste that would have been generated when producing a single box template of the same size.

It should be understood, for purposes of the present invention, that the mechanism for loading source packaging material 808a into production track 800, and for unloading processed packaging material 808b from production track 800 can be accomplished in ways other than with the illustrated material loading tray 802 and material exit tray 806. For example, one or more embodiments make use of conveyor platforms, or even operate without the use of trays or platforms.

Although production track 800 is depicted as having produced two identical tiled templates 809a and 809b, embodiments of the invention can produce any variety of different template types, shapes, sizes, and orientations, with these different templates being configured in any appropriate tiled configuration. Thus, production track 800 can produce a plurality of templates, each having differing box types, shapes, and sizes in a parallel, tiled manner. Furthermore, although production track 800 is depicted as having produced two templates 809a and 809b in a parallel, tiled manner, production track 800 could produce any number of templates in a parallel, tiled manner (e.g., three or more).

Production track 800 is capable of producing templates for boxes having any number of characteristics. As mentioned, different types of boxes or other packaging may be used or desirable for different packaging projects. Box size and additional features includes in the boxes can vary based on what is being enclosed within the box. Enclosing a heavy or fragile object may, for example, dictate that a box of a certain type of material be used, or that a box that has improved protection or construction characteristics (e.g., glue flap, integral corner protectors, full size flaps, nunatabs, etc.) be used. Production track 800 can be configured to produce boxes having these features in a parallel, tiled manner. For example, production track 800 can produce boxes having glue flaps, and when doing so tiling the boxes can involve tiling the box templates so that edges on glue flaps of a first box are collinear with edges on glue flaps of a second box. Furthermore, production track 800 can produce paired boxes having connected by nunatabs. For example, the nunatabs may be positioned proximate to the glue strips.

Figure 9:
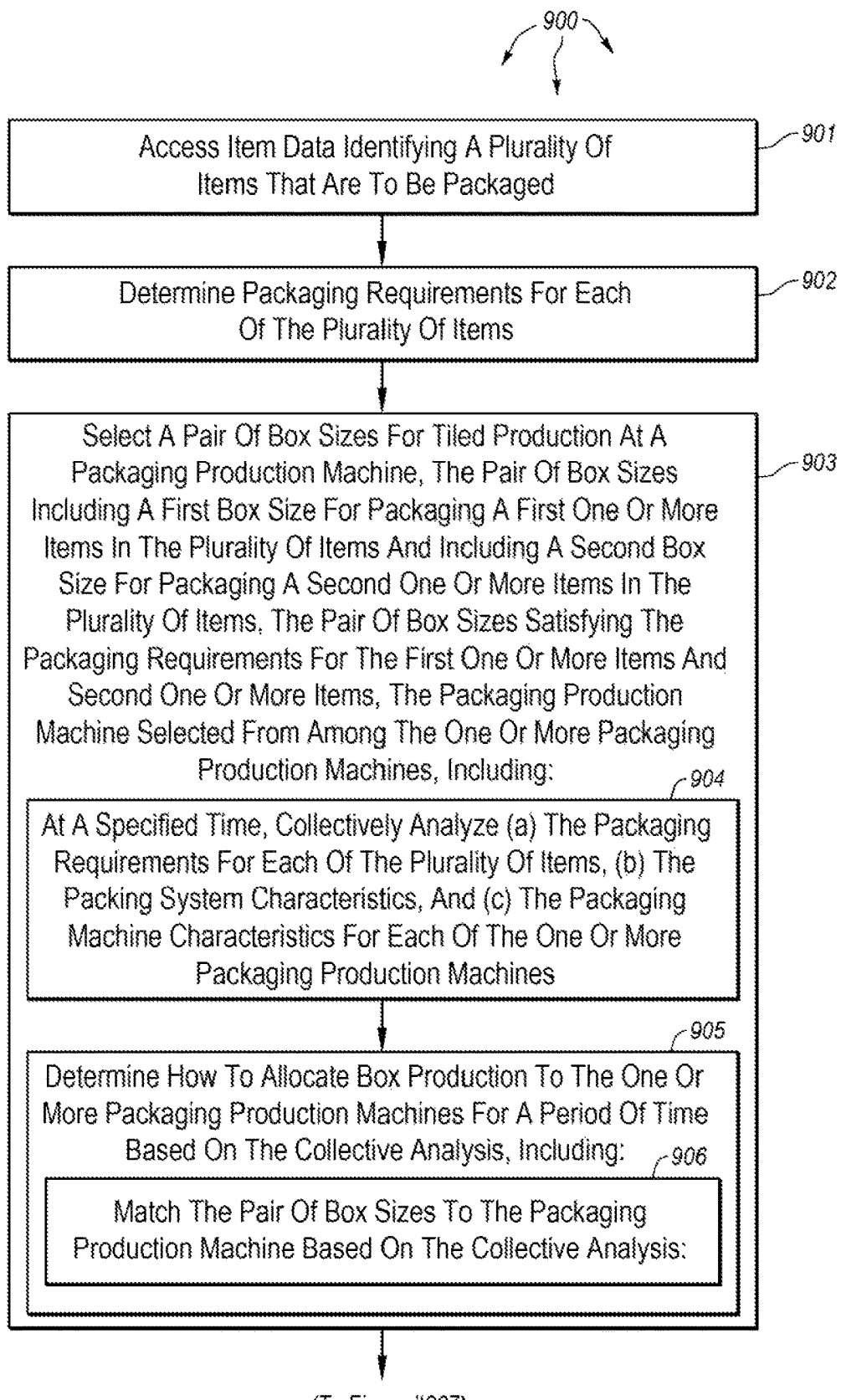
FIG. 9 illustrates a flow chart of an example method for tiling production for a pair of boxes.
Figure 9:
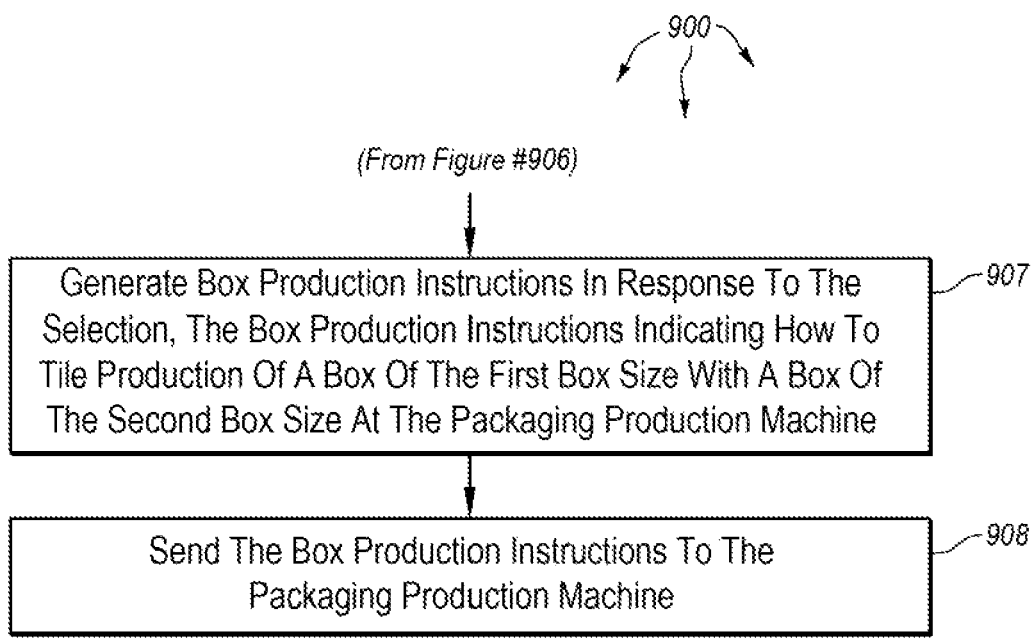

FIG. 9 details a flowchart of an exemplary method 900 for tiling production for a pair of boxes. Method 900 will be described with respect to the components and data of computer architecture 100 and production track 800.

Method 900 includes an act of accessing item data identifying a plurality of items that are to be packaged (act 901). For example, computer system 104 can receive information, either though user input or through data in a data store (e.g., data store 106) indicating two or more items that are to be packaged. The information can include, for example, object types, object dimensions, durability characteristics, and the like. In some embodiments, act 901 can include accessing a queue of items that are to be packaged, such as a first-in-first-out (FIFO) queue, a last-in-first-out (LIFO) stack, etc.

Method 900 also includes an act of determining packaging requirements for each of the plurality of items (act 902). For example, computer system 104 can utilize embodiments previously described to automatically (or substantially automatically) determine packaging requirements for each of the plurality of items. Determining packaging requirements can include selection of potential packaging designs and potential packaging materials using information in data store 106. Thus, where appropriate, computer system 104 can also access one or more of packaging materials table 501 or machine data table 502. Referring to FIG. 5A, for example, packaging materials table 501 indicates packaging materials that are available within production architecture 100, some of which may be available at packaging production machine 102. For example, packaging materials table 501 includes information such as name, type, width, thickness, quantity, and cost of packaging material. Furthermore, referring to FIG. 5B, machine data table 502 includes information about packaging production machines in production architecture 100. For example, machine data table 502 includes information about packaging production machines, including names, associated operational costs (e.g., relative cost for each second that is required to produce a packaging product), availability of different packaging materials at the machines, etc. As such, act 902 can, in one or more embodiments, utilize one or more acts described previously in connection with at least the FIG. 2 (i.e., method 200 for optimizing production of packaging products) and/or FIG. 6 (i.e., method 600 for selecting a design for a packaging product) when determining packaging requirements for each of the plurality of items.

Alternatively, computer system 104 can prompt a user for express input providing packaging requirements, consult a database that maps item types with packaging requirements, or use any other appropriate mechanism for determining packaging requirements.

Method 900 includes an act of selecting a pair of box sizes for tiled production at a packaging production machine, the pair of box sizes including a first box size for packaging a first one or more items in the plurality of items and including a second box size for packaging a second one or more items in the plurality of items, the pair of box sizes satisfying the packaging requirements for the first one or more items and second one or more items, the packaging production machine selected from among the one or more packaging production machines (act 903). For example, optimization module 112 at computer system 104 can determine, based on the packaging requirements, optimized box sizes for each of the plurality of items. The optimized box sizes may be chosen based on one or more of the suitability of each box size for each item, the ability of the box sizes to be tiled together, the type and/or dimensions of available production machines, cost considerations, user preference, or any other factor described in this disclosure in connection with optimizing production of packaging products. It will be appreciated that selecting the pair of box sizes can involve selecting the same box size for each item, or selecting different box sizes for different items. In some circumstances, different box sizes may be selected even for identical items (e.g., based factors such as production availability, the ability of box sizes to tile, etc.)

In connection with selecting a pair of box sizes and selecting a packaging production machine from among the one or more packaging production machines, act 903 includes an act of, at a specified time, collectively analyzing (a) analyzing (a) the packaging requirements for each of the plurality of items, (b) the packing system characteristics, and (c) the packaging machine characteristics for each of the one or more packaging production machines (act 904). For example, act 904 can involve an analysis of packaging production machine 102 (as well as any other production machines) and an analysis of any production tracks at those machines, in view of the packaging requirements. The analysis can include taking into consideration the current and future workloads of the packaging production machine(s), the cost of operating each machine, source material availability at each machine, maximum width of each production track, etc.

Act 903 also includes an act of determining how to allocate box production to the one or more packaging production machines for a period of time based on the collective analysis (act 905). For example, based on the foregoing analysis of act 904 it can be determined that, given current machine and materials availability, the particular packaging requirements for the items are best met by producing the first and second boxes in a tiling arrangement at a particular production track at a particular production machine during a given period of time. Determining how to allocate box production can also include comparing dimensions of box templates or blanks that are to be tiled, and ensuring that the dimensions for each template/blank are within specified thresholds of one another. If the dimensions are not within specified thresholds of one another, act 905 can include modifying the design of one or more of the box templates or blanks so that they fall within the specified thresholds.

Act 905 includes an act of matching the pair of box sizes to the packaging production machine based on the collective analysis (act 906). For example, the pair of box sizes can be matched to packaging production machine 102. Act 906 can include determining that packaging material loaded at the production machine is large enough to tile production of the requested boxes. Act 906 can also include determining any waste that may result from producing the part of boxes, and ensuring that the waste is within acceptable tolerances. Act 906 can also include determining that the production machine can handle the required load.

Method 900 also includes an act of generating box production instructions in response to the selection, the box production instructions indicating how to tile production of a box of the first box size with a box of the second box size at the packaging production machine (act 907). For example, computer system 104 can generate production instructions 114 which instruct a production track (e.g., one or production track 102A, 102B or 102C) at production machine 102 to use raw materials to create a plurality of tiled packaging products.

In addition, method 900 also includes an act of sending the box production instructions to the packaging production machine (act 908). For example, computer system 104 can send production instructions 114 to production machine 102 to generate the boxes in a tiled and parallel manner.

While the method 900 has been described in the context of producing a pair of boxes in parallel, method 900 is also applicable for producing any number of boxes in any tiled configuration. For example, method 900 may include tiling three box sizes together, four box sizes together, five box sizes together, etc.

When four box sizes are tiled, method 900 may include selecting a second pair of box sizes for tiled production, including a third box size for packaging a third one or more items in the plurality of items and a fourth box size for packaging a fourth one or more items in the plurality of items. Then, based on further analysis, the third and fourth box sizes can be tiled with other box sizes in any appropriate configuration. In some embodiments, for example, one or both of the third or fourth boxes may be produced in parallel with one or both of the first or second boxes, at least in part.

Accordingly, embodiments of the invention also include producing box templates or blanks in a parallel, tiled manner. Doing so can improve the speed and efficiency with which boxes are created, can make optimal use of production hardware, and can help to reduce waste.

Figure 10:
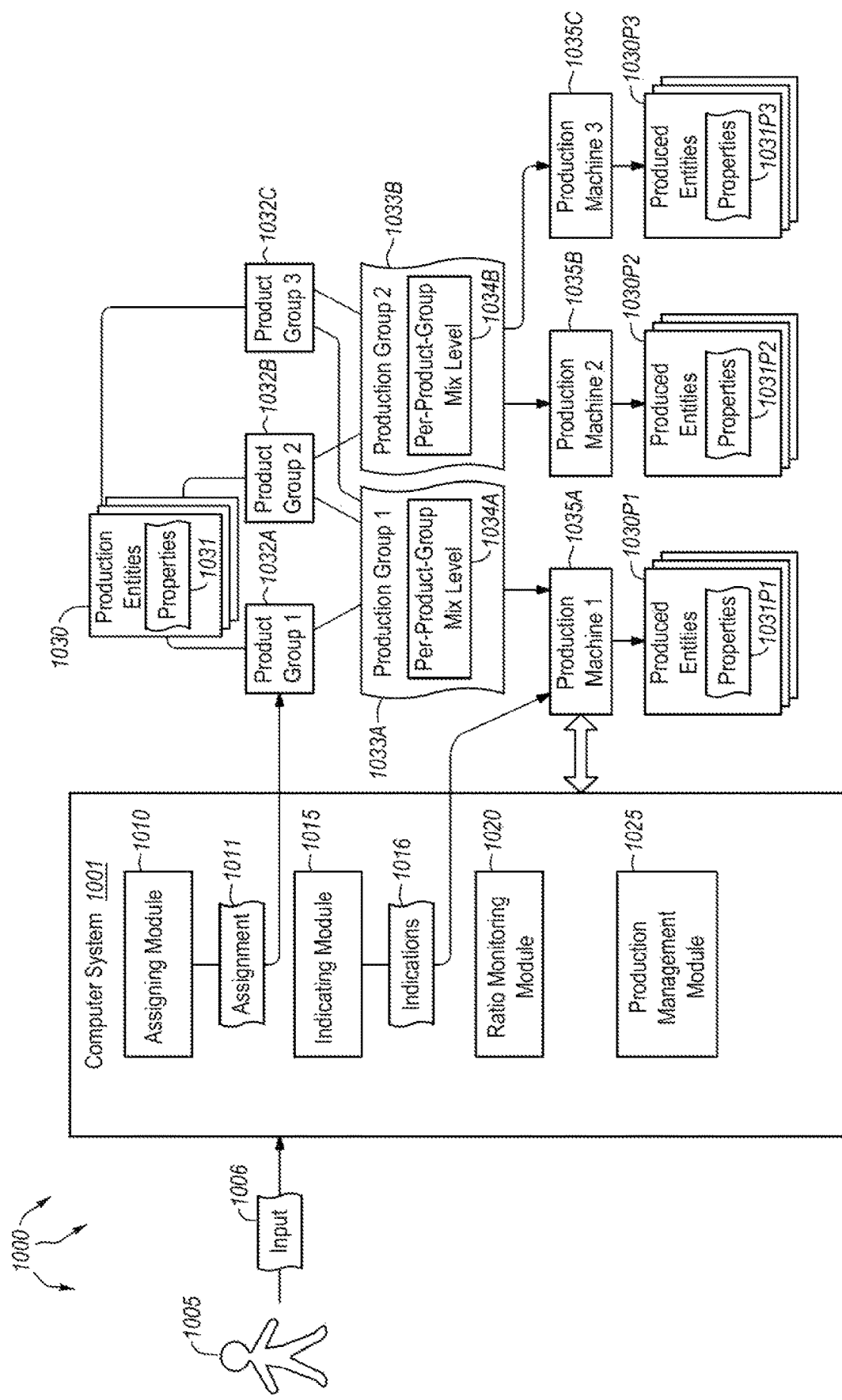
FIG. 10 illustrates an example computing environment in which various embodiments may be implemented including dynamically assigning product groups to production machines using production groups and producing product groups at a specified ratio using production groups.

FIG. 10 describes a computing environment 1000 that includes a computer system 1001. The computer system 1001 may be any type of computing system including a cloud computing system. In this description and in the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

In addition to the cloud computing environments described above, any of the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware. Thus, computer system 1001 may be any type of hardware capable of processing executable instructions.

The computer system 1001 includes multiple different modules for performing a variety of tasks. For instance, the assigning module 1010 may dynamically assign a production entity to a product group. Thus, one of production entities 1030 may be assigned to product group 1 (1032A), one or more may be assigned to product group 2 (1032B) and one or more may be assigned to product group 3 (1032C). It will be understood that more or fewer than three product groups may be used. Moreover it will be understood that, at least in some cases, zero production entities may be assigned to a product group. A production entity may include any type of packaging including boxes, cartons, envelopes or other packaging. A product group may be assigned zero production entities based on the production entity's properties. Thus, each product group (1032A-C) may have zero or more production entities.

As mentioned above, each production entity has an associated set of properties 1031. The properties may include length, width, height, weight, current location, product branding, or other properties. Each product group may be assigned production entities with certain properties. For instance, product group 1 (1032A) may be assigned cartons that are at least 36" long and 24" wide (e.g. "large" boxes), while product group 2 (1032B) may be assigned cartons that are less than 15" long and 10" wide (e.g. "small" boxes). It will be understood that these numbers are arbitrarily chosen, and that substantially any production entity property may be used when assigning production entities to product groups.

Each product group may belong to a production group (1033A or 1033B). A product group may be assigned to zero production groups if, for example, a user desires to halt production of that product group for a period of time. As with the product groups, it is clear that while two production groups are shown in FIG. 10, more or fewer than two production groups may be used. Each production group may have production machines associated with it (e.g. production machines 1, 2 and 3 (1035A, 1035B and 1035C, respectively). A production group may have zero production machines associated with it if, for example, a user desires to halt production of the assigned product groups for a period of time. These production machines are similar to or the same as packaging production machines 102 described above. The production machines actually make the production entities specified in the product groups.

The production groups specify per-product-group mix levels for each of their product groups, and use the production machines to produce the production entities of those product groups at the specified mix level. For example, if the production entities of product group 1 (1032A) and product group 2 (1032B) are to be produced at a 1:2 ratio (per the mix level 1034A of production group 1 (1033A)), then production machine 1 will produce two cartons of product group 2 for every one carton of product group 1. This will be explained in further detail below with regard to methods 1100 and 1200 of FIGS. 11 and 12, respectively.

Figure 11:
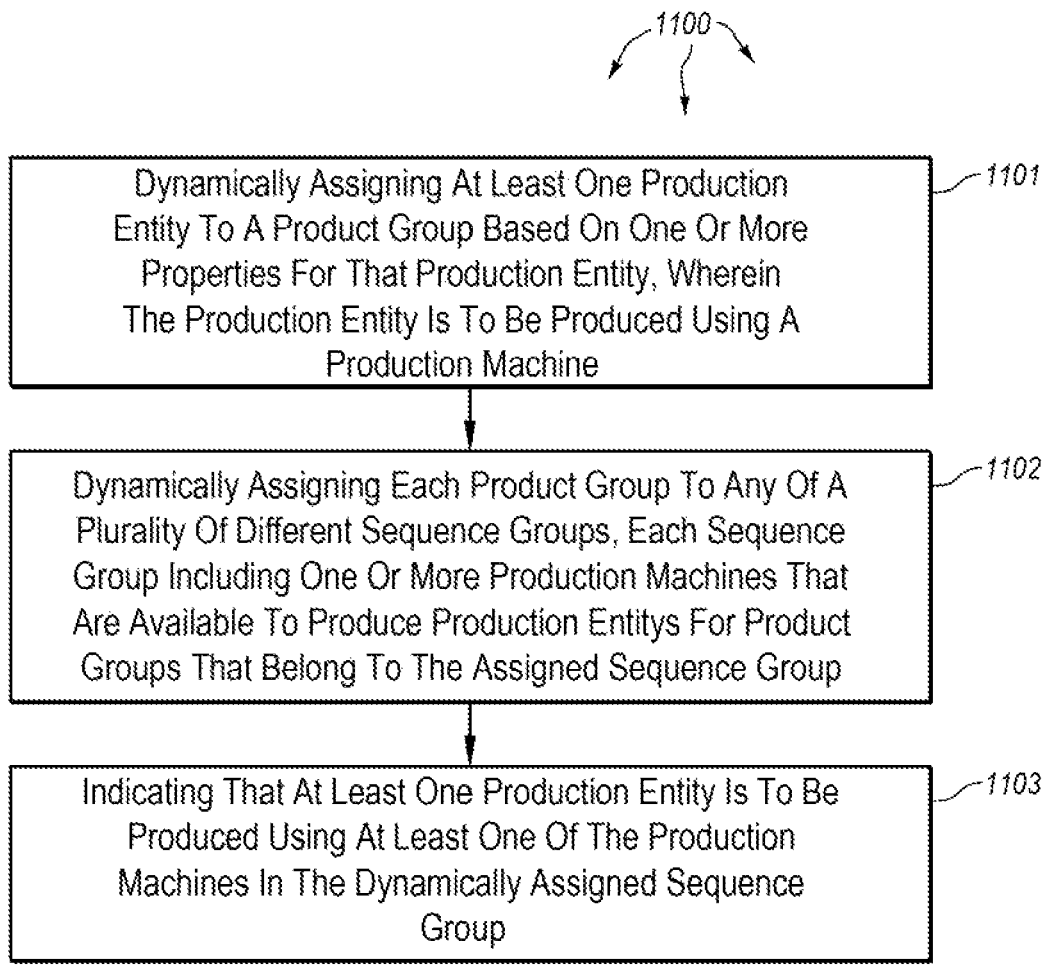
FIG. 11 illustrates a flow chart of an example method for dynamically assigning product groups to production machines using production groups.
Figure 12:
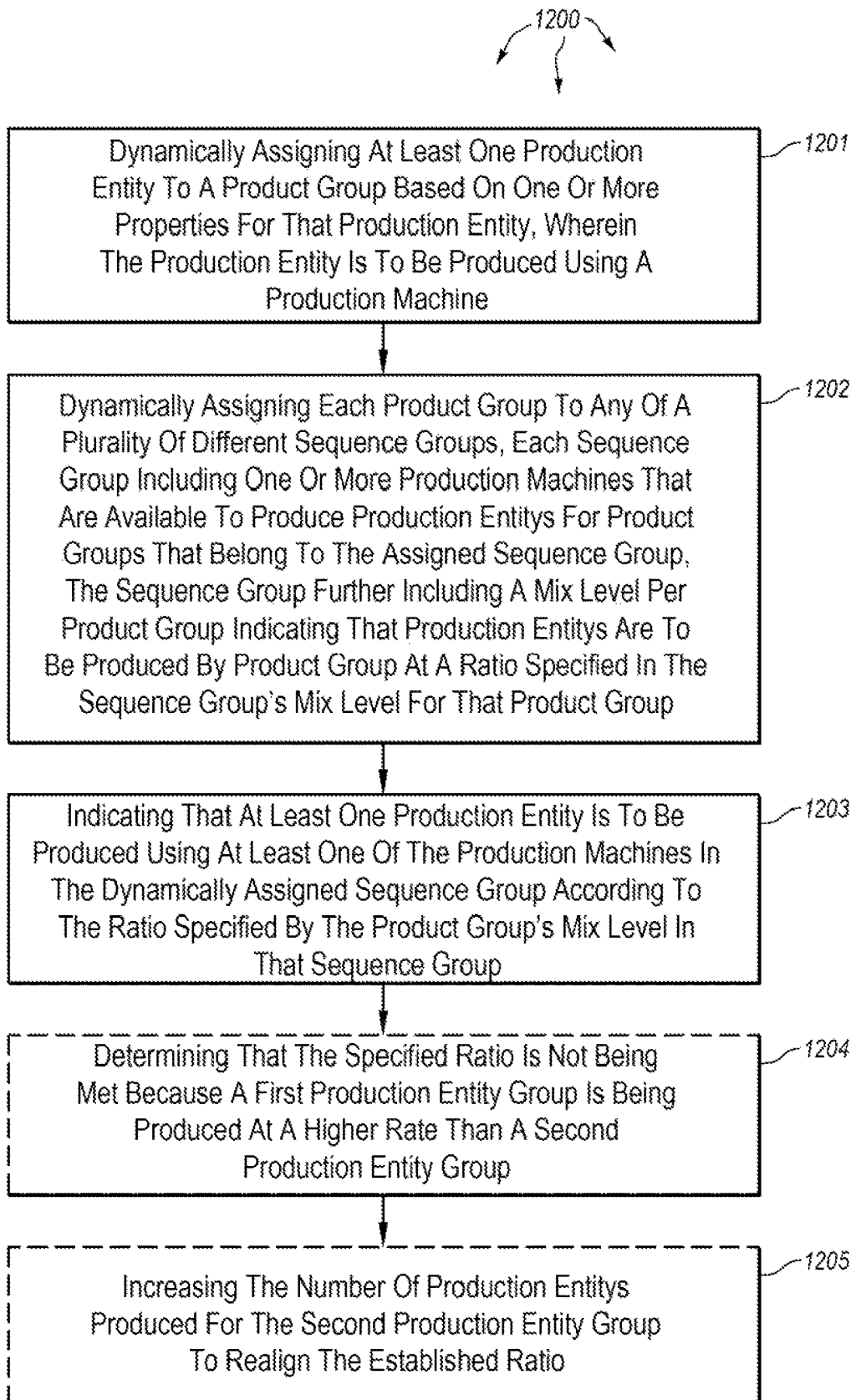
FIG. 12 illustrates a flow chart of an example method for producing product groups at a specified ratio using production groups.

In view of the systems and architectures described above, methodologies that may be implemented in accordance with the disclosed subject matter will be better appreciated with reference to the flow charts of FIGS. 11 and 12. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 11 details a flowchart of an exemplary method 1100 for dynamically assigning product groups to production machines using production groups. Method 1100 will be described with respect to the components and data of computer architecture 1000.

Method 1100 includes an act of dynamically assigning at least one production entity to a product group based on one or more properties for that production entity, wherein the production entity is to be produced using a production machine (act 1101). For example, assigning module 1010 can dynamically assign zero or more of production entities 1030 to zero or more of product groups 1, 2 and 3 (1032A, 1032B and 1032C, respectively). The production entities may be assigned to different groups based on their properties. For instance, one of the production entity properties 1031 may be brand name. Thus, production entities with Brand Name 1 might go to product group 1, production entities with Brand Name 2 to product group 2, and so on. Other properties may include length, width, height, weight or other properties. In some cases, the production entities may be assigned (via assignment 1011) based on combinations of properties 1031. Thus, for instance, product group 3 may include boxes that have Brand Name 3, are a minimum height of 24" and have a maximum width of 10". This is only one example among substantially any combination of property groupings.

In some cases, user 1005 may specify (via input 1006) which production entities are to be assigned to which product groups. Additionally or alternatively, production entities may be assigned to product groups according to a predefined policy or by some other indication. Thus, if a policy indicated that production entities 1030 with certain properties 1031 were to go product group 2 (1032B), those production entities may be automatically assigned by the assigning module 1010 according to the established policy.

Method 1100 next includes an act of dynamically assigning each product group to any of a plurality of different production groups, each production group including any number of production machines that are available to produce production entities for product groups that belong to the assigned production group (act 1102). As mentioned above, production groups may include substantially any number of product groups. As shown in FIG. 1, production group 1 (1033A) includes product groups 1 and 2, while production group 2 (1033B) includes product groups 2 and 3. Accordingly, product groups can be part of multiple different production groups.

The product groups of each production group will be processed by production machines that are associated with that production group. Thus, as production machine 1 (1035A) is associated with production group 1, the production entities of product groups 1 and 2 (1032A and 1032B) will be produced by production machine 1. Similarly, because productions machines 2 and 3 (1035B and 1035C) are associated with production group 2 (1033B), the production entities of product groups 2 and 3 (1032B and 1032C) will be produced by production machines 2 and 3. Accordingly, the production entities produced by production machine 1 (1030P1) will have properties 1031P1 of either product group 1 or 2, and the production entities produced by production machines 2 and 3 (1030P2 and 1030P3) will have properties (1032P2 and 1032P3) of either product group 2 or 3.

Method 1100 also includes an act of indicating that at least one production entity is to be produced using at least one of the production machines in the dynamically assigned production group (act 1103). Thus, indicating module 1015 may send an indication 1016 to any of production machines 1, 2 or 3 that one or more production entities are to be produced using the production machine(s) associated with that production group. Accordingly, as in the example above, the indicating module 1015 may indicate to production machine 1 (1035A) that production entities of product groups 1 and/or 2 are to be produced. In some cases, these production entities will be produced at a specified ratio, which will be explained in greater detail below.

In some cases, when production machines are producing production entities, they may finish producing the production entities for a given product group. For example, if production machines 2 and 3 (1035B and 1035C) are producing production entities for product groups 2 and 3 (1032B and 1032C) and production machine 2 finishes producing production entities for group 2, it may then begin producing production entities for group 3. Alternatively, a new product group may be generated or accessed from another source, and production entities for that new product group may be processed by the production machine that would otherwise be idling. Any newly generated product groups may include production entities with specified properties as indicated, perhaps, by user 1005. Moreover, that new product group may be produced at the same ratio as the previous product group, or may be produced at a different ratio.

Production machines may also run out of production (e.g. packaging) material for certain production entities. Thus, for example, computer system 1001 may determine that because production machine 1 (1035A) has run out of production material while producing production entities for product group 2 (in some cases, at a specified ratio), production of product group 2's production entities is to be initiated at production machine 2 (1035B) or at some other production machine. In this case, the production ratio may also be maintained or dynamically changed as needed to make up for production machine 1 running out of material. Producing production entities at a specified ratio will now be discussed in relation to method 1200 of FIG. 12.

FIG. 12 illustrates a flowchart of a method 1200 for producing product groups at a specified ratio using production groups. The method 1200 will now be described with frequent reference to the components and data of computer architecture 1000.

Method 1200 includes an act of dynamically assigning at least one production entity to a product group based on one or more properties for that production entity, wherein the production entity is to be produced using a production machine (act 1201). Thus, for example, assigning module 1010 may dynamically assign production entities 1030 to product groups 1-3 based on the production entities' properties 1031. Each of the production entities will eventually be produced by a production machine, depending on which product group the production entity is assigned to, and which production group the product group is assigned to.

Method 1200 also includes an act of dynamically assigning each product group to any of a plurality of different production groups, each production group including any number of production machines that are available to produce production entities for product groups that belong to the assigned production group, the production group further including a mix level per product group indicating that production entities are to be produced by product group at a ratio specified in the production group's mix level for that product group (act 1202). As above, each product group can be assigned to any of a number of production groups. Each production group includes a mix level or ratio at which each product group is to be produced. For example, production group 1 (1033A) may include a per-product-group mix level 1034A that indicates that product group 1 (1032A) and product group 2 (1032B) are to be produced at a 2:1 ratio by the production machines associated with that production group (in FIG. 1, production machine 1 (1035A)). Thus, production machine 1 would produce two production entities of product group 1 for every one production entity it produced for product group 2. It will be understood that this is merely one example of many different ratios that may be used. The ratio may be specified by a user (e.g. 1005), and may be dynamically updated during production entity production.

Method 1200 further includes an act of indicating that at least one production entity is to be produced using at least one of the production machines in the dynamically assigned production group according to the ratio specified by the product group's mix level in that production group (act 1203). Indicating module 1015 may send indications 1016 to the production machines that are to produce the specified product groups. Thus, if production entities for product groups 2 and 3 (1032B and 1032C) are to be produced at production machines 2 and 3 (1035B and 1035C) according to a mix level 1034B of 1:3 (as indicated in production group 2 (1033B)), the indications 1016 may be sent to production machines 2 and 3 to begin production at the rate of one production entity for product group 2 for every three production entities of group 3. The production group will produce production entities at the per-product-group mix level 1034B unless otherwise specified. In some cases, the mix level may be updated upon receiving an indication of a higher priority order has come in, and that the higher priority production entities are to be produced at a higher rate.

Figure 13:
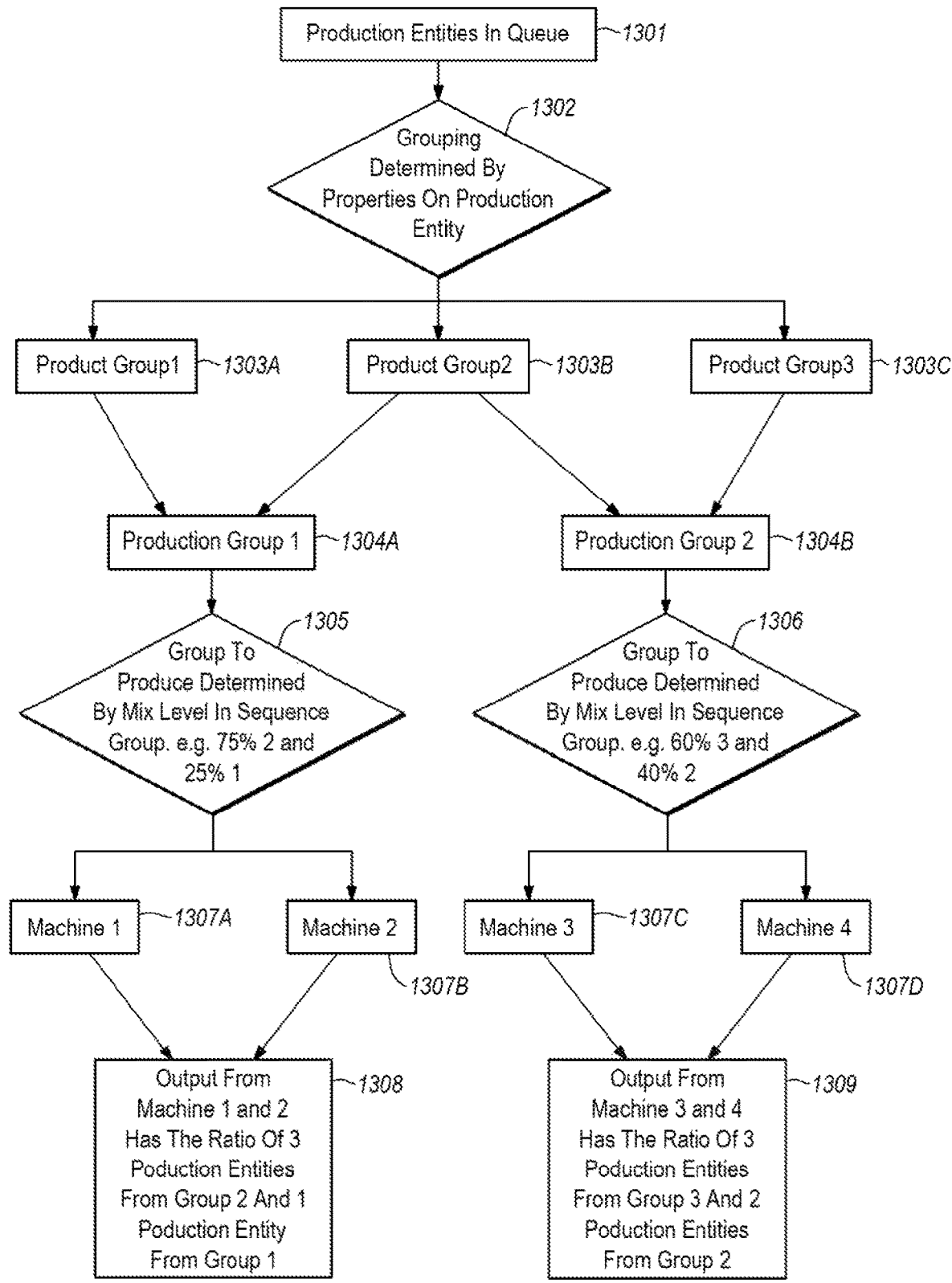
FIG. 13 illustrates a flow chart in which product groups are dynamically assigned to production machines using production groups.

FIG. 13 illustrates two different examples of how production entities may be produced using specified ratios. As above, production entities (i.e. packaging) in a queue 1301 are grouped based on production entity properties (1302). They may be grouped into substantially any number of groups, but here they are grouped into three groups: product group 1 (1303A), product group 2 (1303B) and product group 3 (1303C). Product groups 1 and 2 are assigned to production group 1 (1304A), and product groups 2 and 3 are assigned to production group 2 (1304B). The per-product-group ratio specified for production group 1 is 75% of the production entities produced are for group 2, and 25% of the production entities produced are for group 1. Production machines 1 and 2 (1307A and 1307B) will then produce the production entities 1308 at a rate of three production entities from group 2 (1303B) per one production entity from group 1 (1303A). The per-product-group ratio specified for production group 2 is 60% of the production entities produced are for group 3, and 40% of the production entities produced are for group 2. Production machines 3 and 4 (1307C and 1307D) will then produce the production entities 1309 at a rate of three production entities from product group 3 (1303C) per two production entities from product group 2 (1303B). These examples are merely two of many different examples, and are provided for illustrative purposes only.

The ratio monitoring 1020 of computer system 1001 may be used to monitor the production of production entities from the various production groups, and may ensure that each per-product-group mix level is being maintained across the various production machines. In some embodiments, the ratio monitoring module 1020 may determine that a specified production ratio is not being met because a first product group is being produced at a higher rate than a second product group (optional act 1204). For example, the ratio monitoring module may determine that production entities for product groups 2 and 3 are not being produced at the per-product-group mix level 1034B specified for those product groups. The production management module 1025 may then increase or decrease the number of production entities produced for a certain product group to realign the established ratio (optional act 1205). Thus, using the ratio monitoring module 1020 and the production management module 1025, the computer system 1001 may continually monitor production entity production and ensure that production entities are produced at the proper ratio.

In one embodiment, the computer system 1001 may determine that, for example, production machine 2 (1035B) has finished producing production entities for product group 2 (1032B) at the ratio indicated in the first product group's corresponding production group. The indicating module 1015 may then be used to initiate production at production machine 2 of another specified product group (e.g. product group 3) and start at the ratio indicated in the second product group's corresponding production group. Thus, in this case, the production entities of product group 3 would be produced at the same ratio at which the production entities of product group 2 were being produced before production finished.

The production management module 1025 may also determine, at any point during production, that another production machine within a specified production group is better equipped to produce a specified product group based on the properties of the production entities currently in the product group. For instance, if, for example, production machine 2 was better (i.e. more efficient) at producing large boxes, while production machine 3 was better at producing small boxes, production may be shifted from one machine to another based on which machine was best equipped to produce the production entities. Thus, in the above example, if production machine 3 had been producing large boxes, and it was determined that production machine 2 was available, production of the large boxes would be shifted to production machine 2. Any existing per-product-group mix level 1034B would be maintained after the switch. Thus, production machine 3 would begin producing the production entities that production machine 2 was working on, at the ratio specified in the per-product-group mix level.

In some cases, the ratio monitoring module 1020 may determine that a production group's mix level is no longer being met for a specified product group. Thus, in FIG. 13, if production machines 1 and 2 (1307A and 1307B) are no longer producing production entities from product groups 1 and 2 (1303A and 1303B) at a 1:3 ratio (because, for example, production machine 1 ran out of material or finished a specified number of production entities), a new product group may be produced at production machine 1 at the previously specified ratio of 1:3. Thus, one production entity from the new production group would be produced for every three of production group 2 (1303B). In this example, production machine 1 may be idling for some time before a new product group is added. In order to maintain the ratio, production machine 1 may attempt to produce a large number of production entities for the new product group to realign the production ratio. In such cases, production of the new product group may be limited to a specified number when realigning the ratio. Thus, regardless of the amount of time that passed while machine 1 was idling, the time spent realigning the ratio may be limited to a specified number of production entities.

Still further, in another example, the ratio monitoring module 1020 may determine that a product group (e.g. product group 3 (1032C)) has run out of production entities to produce. As such, production entities for product group 3 are not produced for a period of time. Upon completion of that period of time, the computer system 1001 may determine that product group 3's production entities are to be produced again. In such cases, the previously specified mix level for product group 3's production entities will be maintained, without attempting to make up for the production entities that were skipped while the product group was out of production entities. Any skipped production entities may still be counted in the ratio. Thus, when production entities are again added to the production group, the ratio monitoring module will still show that the production ratio is being maintained.

In some embodiments, a substitute product group may be designated for another product group. For example, product group 3 (1032C) may be designated as a substitute product group for product group 2 (1032B). In such cases, production entities may be produced for the designated substitute production group (group 3) in lieu of production entities for the other group (group 2). When production entities are produced for the substitute group (group 3), the production entities are counted in the mix level as being production entities of the other product group (group 2). Thus, product groups may be substituted in to maintain a production ratio. The production ratio may thus be maintained in a variety of different ways, including providing substitute groups, counting skipped production entities, and limiting production entities produced during realignment. The production ratio may also be changed during production in cases where such is desirable.

In some cases, production entity properties (or even property values) may be prioritized over other properties. As such, production entities with those properties will be produced with at a higher priority level than other production entities. For example, if production entities had properties of Brand Name 1, Brand Name 2 and Brand Name 3, and if brand names 1 and 2 were prioritized over 3, production entities having Brand Name 1 and Brand Name 2 properties would be produced at the specified mix level, while production entities with the Brand Name 3 property would be skipped. When production entities are skipped due to an established priority, at least in some cases, the established mix level is not realigned to compensate for the prioritization. Still further, similar to prioritizing certain production entity properties, production may be halted (temporarily or permanently) for production entities with a specified property or property value.

Accordingly, methods, systems, and computer program products are described which dynamically assign product groups to production machines using production groups. Moreover, methods, systems, and computer program products are described which produce product groups at a specified ratio using production groups.

Additionally, at least one embodiment of the present invention can comprise a customizable management system. In particular, the customizable management system can be configured to universally integrate with a variety of different systems within a variety of unique packaging production architectures. In many cases, when installing an automated packaging production machine 102, an organization already has established inventory, picking, and packaging procedures. Conventional methods of installing new packaging production machines often require extensive ground-up customized software development in order to properly control each of the individual machines and components, in conjunction with the automated packaging production machine 102. In contrast, embodiments of the present invention, provide a customizable management system that comprises modules and scripts that allow for easy and quick installation of packaging production machines within nearly any packaging production architecture.

The customizable management system can include one or more modules that are configured to operate with various components of a production architecture 100. For example, one or more modules may provide flexible sets of picking line configuration scripts, which may be compatible with different respective picking line architectures. As used herein, modules are used for clarity and explanatory purposes. In various embodiments of the present invention, the modules may be otherwise divided, combined, and or named. Additionally, in various embodiments, modules may comprise software and/or hardware components. Similarly, as used herein, scripts comprise any computer code configure to provide instructions to modules, communicate between various packaging production architecture equipment, and/or to provide additional function to the customizable management system. Scripts may also be otherwise divided, combined, and/or described and still fall within the scope of this disclosure.

The customizable management system may also comprise one or more packaging production machine modules. The packaging production machine modules making comprise flexible packaging production machine configuration scripts. Each script may be configured to communicate with a distinct type of packaging production machinery. For example, each script may be configured to be compatible with a particular type of packaging production machinery and/or a particular brand of packaging production machinery.

In addition, the customizable management system may comprise a selection control module. The selection control module can be configured to automatically manage the generation of specific package template creation orders for specific packaging production machines 102. In particular, picking line configuration scripts and production machine configuration scripts can provide a selection control module with data to properly identify the picking line and packaging production machine that should receive a particular ordered item.

Accordingly, embodiments of the present invention provide a system and a method for easily setting up and managing a mixture of different packaging production machines and different picking line architectures without requiring a ground-up development of custom code. For instance, a company may comprise multiple packaging production machines, each of which, comprises a particular type of corrugate, a particular size of corrugate, a particular machine speed, and other machine specific attributes. Similarly, the company may have multiple different types of picking line architectures.

Additionally, one or more of the packaging production machines may only be fed by a subset of the available picking line architectures. For example, a company may use a picking line architecture that is based on a box-first model. The company may also use a different picking line architecture that is based on a box-last model. Further, some inventory may only be available to the box-first picking line, while other inventory may only be available to the box-last picking line. In at least one embodiment, the various scripts can function as API interfaces, drivers, extensions, and/or some other software module that allows the customizable management system to communicate with the wide variety of different machines in their wide variety of different configurations.

For instance, in at least one embodiment, an inventory management system can receive an order for a particular product that is only available within a box-first picking line. The inventory management system can communicate the order to the selection control module. The selection control module can identify the appropriate triggers within the box-first picking line, and upon identifying the appropriate trigger, can generate a box template creation order such that the box will be fully constructed at the appropriate time.

In at least one embodiment, the selection control module can be configured to work with a variety of different triggers and trigger types. As used herein, a trigger is an indication received by the selection control module that a box is needed. The trigger indication can comprise a variety of different information depending upon the trigger. For example, the trigger can comprise exact specifications for a box, information relating to the specific items that will be packaged, information relating to the picking line associated with the box, and/or other similar packaging information. Upon receiving the trigger, the selection control module can identify the proper timing for creating a packaging template order. For example, in a box-first model, a completed box must be constructed before the picking process. In contrast, in a box-last model, the items are first picked and then placed within the completed box. In at least one embodiment, the selection control module can properly time the creation of boxes across a variety of different picking lines and packaging machines.

Figure 14:
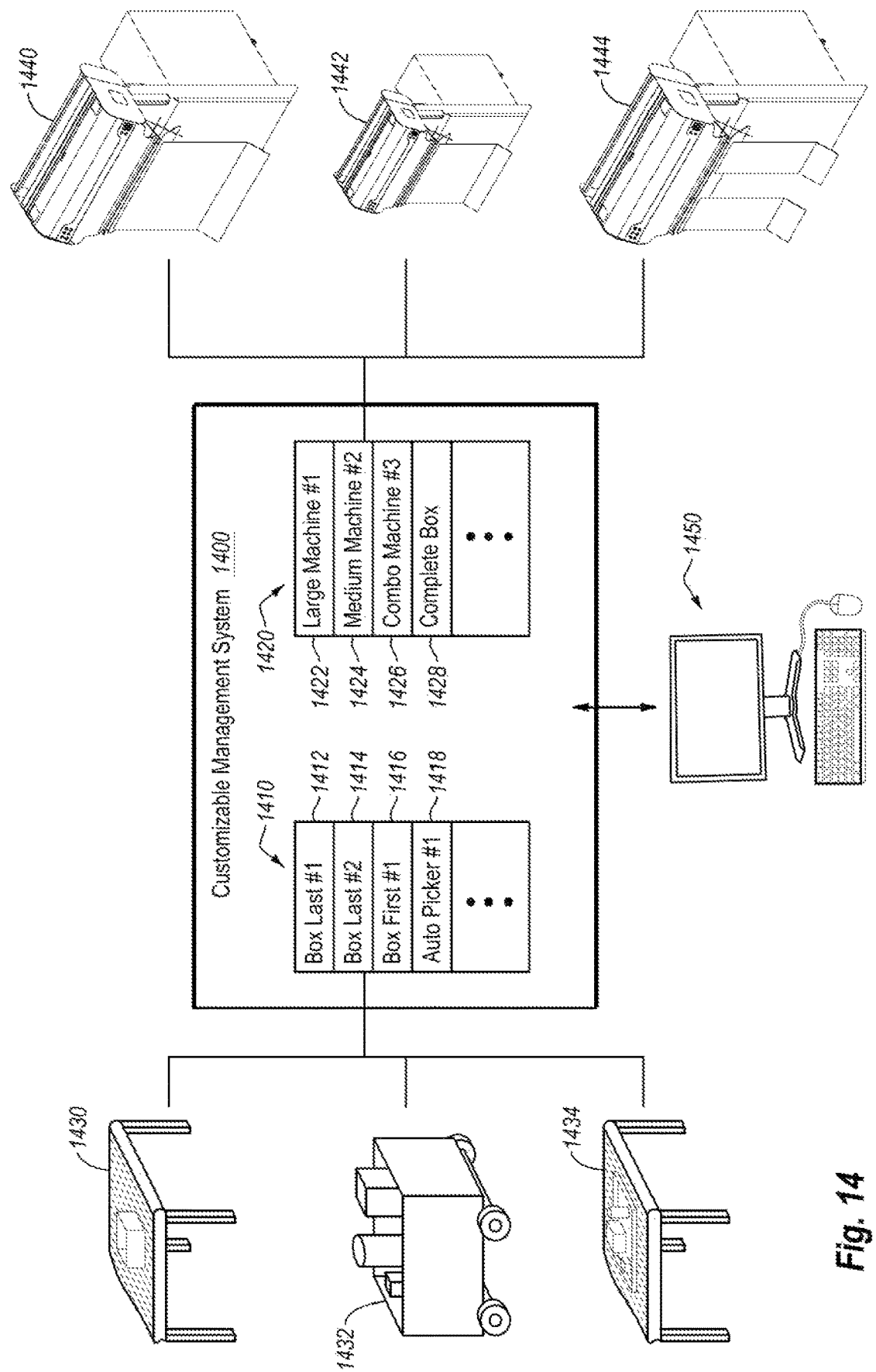
FIG. 14 comprises schematic view of a customizable management system in communication with various packaging components in accordance with implementations of the present invention.

Turning now to FIG. 14, FIG. 14 depicts a schematic diagram for an embodiment of a customizable management system 1400. Additionally, FIG. 14 depicts various picking line architectures 1430, 1432, 1434 and various packaging production machines 1440, 1442, 1444. The customizable management system 1400 may be executed on a computing device 1450. The computing device 1450 may comprise a server, a desktop computer, a cloud-based computing solution, or any other capable device.

The customizable management system 1400 can comprise a set of various picking line configuration scripts 1410 and various packaging production machine configuration scripts 1420. In at least one embodiment, the various scripts 1410, 1420 are displayed to a user in a user interface such that the user can select one or more of the scripts 1410, 1420 as desired. For example, a specific production architecture may comprise a box-first picking line 1430, an automated picking line 1432, and a box-last picking line 1434. In at least one embodiment, a user can select the appropriate box-last configuration script 1412, the appropriate auto picker configuration script 1418, and the appropriate box-first configuration script 1416 to match the respective picking line architectures.

One will understand that the picking line configuration scripts 1410 depicted in FIG. 14 are provided merely for explanatory purposes. In various embodiments, the picking line configuration scripts may be specific to types of picking lines, brands of picking lines, length of picking lines, and various other picking line specific parameters. Upon selecting a particular picking line configuration script 1410, a user may be required to enter additional picking line specific information. For example, upon selecting the auto picker picking line configuration script 1418, the user may be required to specify the type of auto picker used, the inventory accessible to the auto picker, the triggering events used by the auto picker, and various other embodiment specific parameters. Additionally, in at least one embodiment, a user can also associate the various picking line architectures 1430, 1432, 1434, with respective packaging production machines 1440, 1442, 1444 that are fed by the picking lines.

Similar to selecting picking line configuration files 1410, in at least one embodiment, a user can also select packaging production machine configuration files 1420. For example, FIG. 14 depicts a large packaging production machine 1440, a medium packaging production machine 1442, and a double-track packaging production machine 1444. In at least one embodiment, a user can select a large machine configuration file 1422, a medium machine configuration file 1424, and a combo machine configuration file 1426 to correspond with each respective machine.

One will understand that the packaging production machine configuration files 1420 described herein are presented merely for the sake of example. In various embodiments, the packaging production machine configuration files 1420 can be architecture specific, brand specific, corrugate type specific, or specific to other various packaging production machine attributes. Additionally, upon selecting the various packaging production machine configuration scripts 1420, a user may be requested to further specify features relating to the packaging production machines. For example, a user may be requested to specify the type of inventory that is packaged by the packaging production machines, the triggers associated with the packaging production machines, the type of picking lines associated with the packaging production machines, and other similar embodiment specific features.

Accordingly, embodiments of the customizable management system 1400 provide a platform for quickly and efficiently implementing a new production architecture or adjusting a pre-existing production architecture. In particular, the various selectable modules 1410, 1420 disclosed herein provide an easy to access and use method for adding various machinery to a production architecture.

For example, a business with an extensive pre-existing production architecture may desire to upgrade or change one or more portions of its production architecture. For instance, the company may desire to upgrade a package production machine and one or more picking line architectures. Embodiments of the present invention provide a system and method for easily selecting appropriate modules for the respective new packaging production machines and picking line architectures, and for efficiently managing the work with the production architecture.

Figure 15:
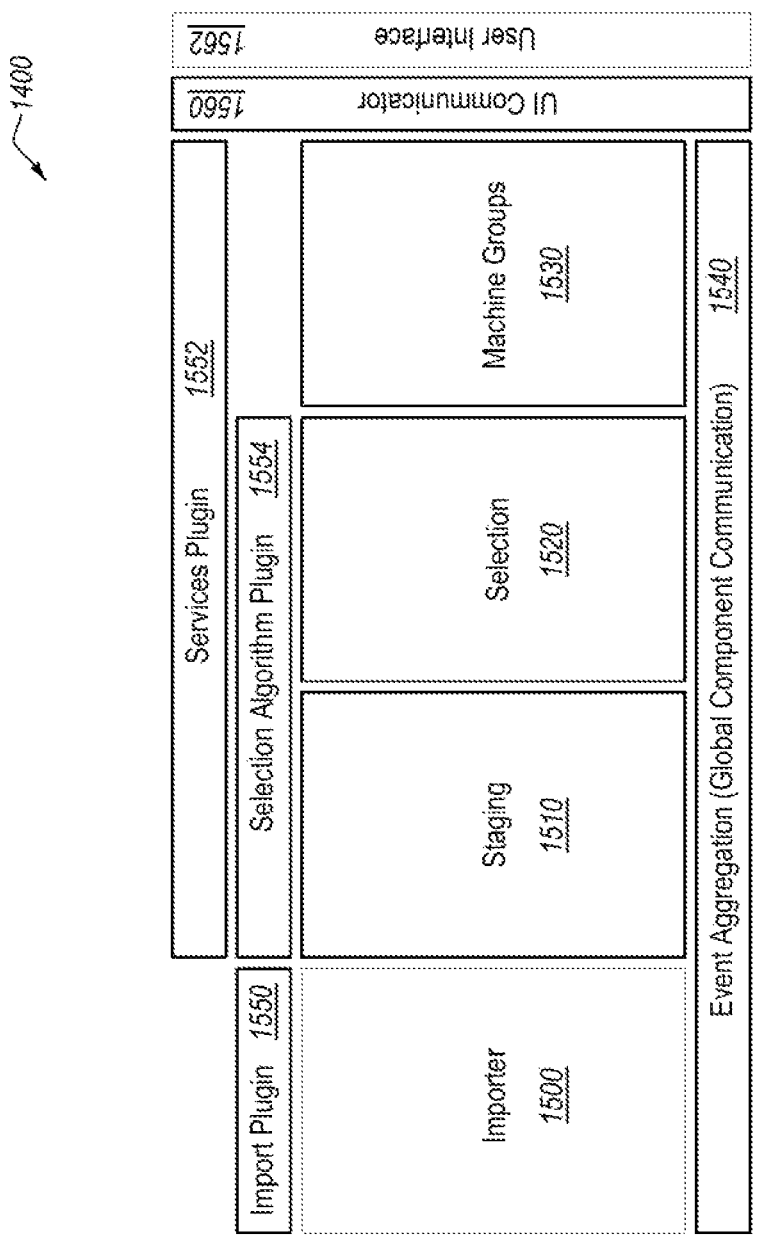
FIG. 15 depicts a schematic diagram of modules with a customizable management system in accordance with implementations of the present invention.

For example, FIG. 15 depicts a schematic diagram of an embodiment of a customizable management system 1400. Specifically, FIG. 15 depicts an exemplary architecture for dynamically managing a variety of different production architectures 100. The depicted customizable management system 1400 comprises an importer module 1500, a staging module 1510, a selection module 1520, a machine group module 1530, an event aggregator module 1540, various plugin modules 1550, 1552, 1554, and various UI modules 1560, 1562.

In at least one implementation, the importer module 1500 provides an extensible platform for importing user-specific packaging data. The importer module 1500 can provide a point of data entry into the customizable management system 1400. The importer module 1500 can determine how to handle data within the system. For example, a particular user system may specify exact box dimensions that are needed, while another user system may instead specify products that are being shipped. Similarly, some user systems may flag specific orders based upon packaging considerations (e.g., liquids, sharp contents, fragile, etc.). In at least one implementation, the importer module 1500 can interpret a variety of different initial parameters into information that is useable by the customizable management system 1400.

The importer module 1500 may also be configured to communicate with a variety of different cubing systems that are configured to determine that optimal box dimensions for a given set of to-be-packaged products. In at least one implementation, the importer module 1500 may comprise an integrated cubing system such that the importer module 1500 is capable of determining ideal box dimensions. As such, in at least one implementation, the importer module 1500 can receive at least partially determined box parameters, or the importer module 1500 can receive information about the to-be-packaged products that are to be boxed and generate appropriate box parameters.

Additionally, in at least one implementation, the importer module 1500 may be able to adjust packaging parameters that it receives. For example, an importer module 1500 may receive a request to construct a particular box. The importer module 1500, however, may identify that the box is intended to hold a liquid, and determine that the requested box is not appropriate for the contents. In at last one implementation, the importer module 1500 can identify that the box is intended to hold a liquid by a content indication that is received with the request. For example, all orders that include a liquid may include an "L" indicator with the request. The importer module 1500 can automatically adjust the requested packaging parameters to an appropriate box that is capable of properly hold a liquid. One will understand that the importer module 1500 can make similar adjustments based upon a variety of different factors, including, but limited to, products sizes, product edges, fragile contents, and other packaging considerations.

In at least one implementation, a user can specify specific rules and instructions for the importer module 1500 regarding box creation. For example, a user may specify the types of boxes that can carry liquids, the maximum size of box, the maximum weight of contents on a per-box basis, and other similar rules. The importer module 1500 can determine based upon information received from the user's production architecture 100 whether the specified rules are met. If the importer module 1500 identifies a violated rule, the importer module 1500 can automatically make the necessary changes to the requested box to conform with the rule and/or the importer module 1500 can notify a user of an error.

In various implementations, the importer module 1500 can be configured to easily integrate with a particular user's packaging system. For example, scripts can be written to parse information of interest out of a user's production architecture 100 and to interpret the information into a form readily accepted by the customizable management system 1400. Additionally, an import plugin module 1550 can receive various plugins for providing additional features to the importer module 1500. For example, the import plugin module 1550 may receive a cubing system as a plugin. The cubing system, through the plugin, can then provide cubing services to the importer module 1500.

The import module 1500 may also comprise an interpreter component that interprets data received from a user's production architecture 100. The interpreter may be configured to identify the type of information that is being received. For example, in at least one implementation, the importer may receive a request to only print a label. The interpreter may be able to identify that request as such, then prepare the necessary commands for the customizable management system 1400 to print a label and not to create a box.

The interpreter may be useful when attempting to integrate the customizable management system 1400 into a production architecture 1400 that is not wholly associated with package production machines 102. For example, a particular production architecture 100 may comprise some package production machines, some bulk-ordered pre-made boxes, some hand-stuffed envelop lines, and other distinct packaging systems. As such, in some cases, it may only be necessary to create a label (e.g., for the hand-stuffed envelope lines or for the bulk-ordered pre-made boxes). Accordingly, implementations of the present invention allow the customizable management system 1400 to be a single point of management for a large variety of packaging systems.

Once data has been processed by the importer module 1500, the importer module 1500 can pass the information to the staging module 1510 through the event aggregation module 1540. The event aggregation module 1540 can function as a universal bus for allowing communication between every module, or at least a portion of the modules, within the customizable management system 1400. For example, the importer module 1500 can prepare commands and data that are internally compatible with the customizable management system 1400 and send those commands and data to the staging module 1510 through the event aggregation module 1540.

In at least one implementation, the staging module 1510 can determine the order in which various packaging requests should be processed. For example, a particular user may process a large order of diverse packaging requests on any given day. Some of the packaging requests may comprise specific priority levels (e.g., rush delivery, same day shipping, 3-5 business days, etc.). Additionally, some packages may be scheduled for shipping with specific parcel carriers that have specific pick-up times. For example, a particular parcel carrier may have an initial pick-up time for small packages scheduled at noon everyday, and an every-other-day pick up for large packages scheduled at 4:00 PM every-other day.

In at least one implementation, the staging module 1510 can determine the order in which packages should be prepared for shipping in order to optimize scheduling and package delivery. For instance, the staging module 1510 can order the packaging requests such that high priority packages are placed first in a packaging queue. Similarly, the staging module 1510 can order the packaging requests such that the packages are complete and ready for pick-up at a scheduled time.

Once the staging module 1510 has analyzed the packaging requests received from the importer module 1500, the staging module 1510 can send queue information to the selection module 1520. In at least one implementation, the selection module 1520 makes the determination about where each individual packaging request should be sent. For example, the selection module 1520 can determine that a particular packaging request should be sent to a specific machine group 1530 based upon the attributes and capabilities of the respective machine group 1530.

In at least one embodiment, different machine groups 1530 may comprise different configurations and capabilities. For example, as mentioned above, in at least one implementation, machine group 1530 may comprise a packaging station that does not comprise a package creation machine, but may instead only comprise a label printer. In at least one embodiment, this packaging station may be represented as a virtual packaging production machine 102, such that it can be incorporated into the customizable management system 1400 in the same way as a standard packaging production machine 102. Similarly, in some embodiments, a machine group 1530 may comprise two different types labels, for example, a high priority label and a standard label. Further, in various implementations different machine groups 1530 may comprise different sizes, types, and configurations of packaging production machines 102.

As such, there are many different set-ups, attributes, and capabilities of various machine groups 1530 (whether virtual or real). In at least one implementation, the selection module 1520 can determine whether a particular machine group 1530 is capable of fulfilling an order, and based upon that determination assign the order to the machine group 1530. For example, the selection module 1520 could determine that a packaging order that only requires a printed label can be sent to a virtual machine group that only comprises a label printer. Similarly, the selection module 1520 can determine that a packaging order that requires a high priority label can be sent to the machine group 1530 with the two different label types.

The selection module 1520 may also be able to divide packages among different types of production architectures 100. For example, a particular user's setup may have both a box-first architecture and a box-last architecture. Certain packages and products may only be available on a particular architecture. The selection module 1520 can automatically identify machine groups 1530 that are best suited for a particular package, based upon the desired package and the package contents.

In at least one implementation, the selection module 1520 provides a package request to a machine group 1530 based upon a communication received from the machine group 1530. For example, a machine group 1530 may send a communication, through the event aggregation module 1540, to the selection module 1520 when it is ready for its next package. As such, in at least one implementation, the selection module 1520 functions in response to communications received from machine group 1530.

In various implementations, packaging production machines 102 and other various packaging related equipment can be described within various machine groups 1530. In at least one implementation, in addition to, or instead of, communicating directly with package production machines 102, the selection module 1520 communicates with a machine groups module 1530. The machine groups module 1530 may comprise a programming interface for communicating with various package production machines 102. For example, the machine groups module 1530 may provide an API for receiving information about the equipment within a particular machine group, workflows for a particular machine group, and capacity information about a particular machine group.

The machine group module 1530 may allow a user to easily incorporate an existing packaging architecture 100 into the customizable management system 1400. For example, a particular architecture 100 may comprise three different packaging lines. Each respective line may comprise different machinery, different picking line architectures, different capabilities, and different capacities. In at least one implementation, the user can create three different work groups—each of which can represent one of the three packaging lines. Each workgroup can comprise information relating to the functions, capabilities, and capacities of each respective packaging line.

Once machine groups 1530 are created, the machine group module 1530 can provide an interface layer for the customizable management system 1400 to communicate with and manage the packaging architecture 100. For example, each machine group can be associated with a workflow that describes to the machine group module 1530 how each respective machine group handles a packaging order. The selection module 1520 can use the workflow when dividing work among different machine groups.

For example, in at least one implementation, a particular packaging order may be associated with restrictions. The restrictions may require a specific type of corrugate to package an order, a specific type of fill to protect an order, a specific type of template, or some other packaging restriction. In at least one implementation, the selection module 1520 analyzes the restrictions and determines what work group 1530 can meet the specific packaging needs.

The customizable management system 1400 of FIG. 15 also depicts various additional modules. For example, a UI communicator module 1560 may provide an API interface layer for various User interfaces 1562. For example, the UI communicator 1560 may provide information to end users through the individual packaging production machines 102, through standalone computing devices, or through any other user interface.

Additionally, as depicted, the customizable management system 1400 may comprise various plugin modules 1550, 1552, 1554. The plugin module may provide interfaces for individuals and third-parties to add additional functionality and compatibility to the overall customizable management system 1400. For example, a selection algorithm plugin may provide additional functionality relating to a particular type of production architecture. Additionally, a service algorithm plug-in may provide functionality for a particular type of production machine (e.g., a unique packaging filler machine).

As such, the import plugin module 1550, the service plugin module 1552, the selection algorithm plugin 1554 provide extensible platforms for quickly integrated the customizable management system 1400 into a wide variety of different production architectures. Additionally, one will appreciate that plugins are often reuseable, and as such, implementation of a customizable management system 1400 can be optimized by reusing plugins. For example, a manufacturer of a particular type of fill machine may develop a plugin for their product. When implementing a customizable management system 1400 at a site that used the particular type of fill machine, a user could simply use the manufacturers plugin to incorporate the fill machine into the system 1400.

Figure 16:
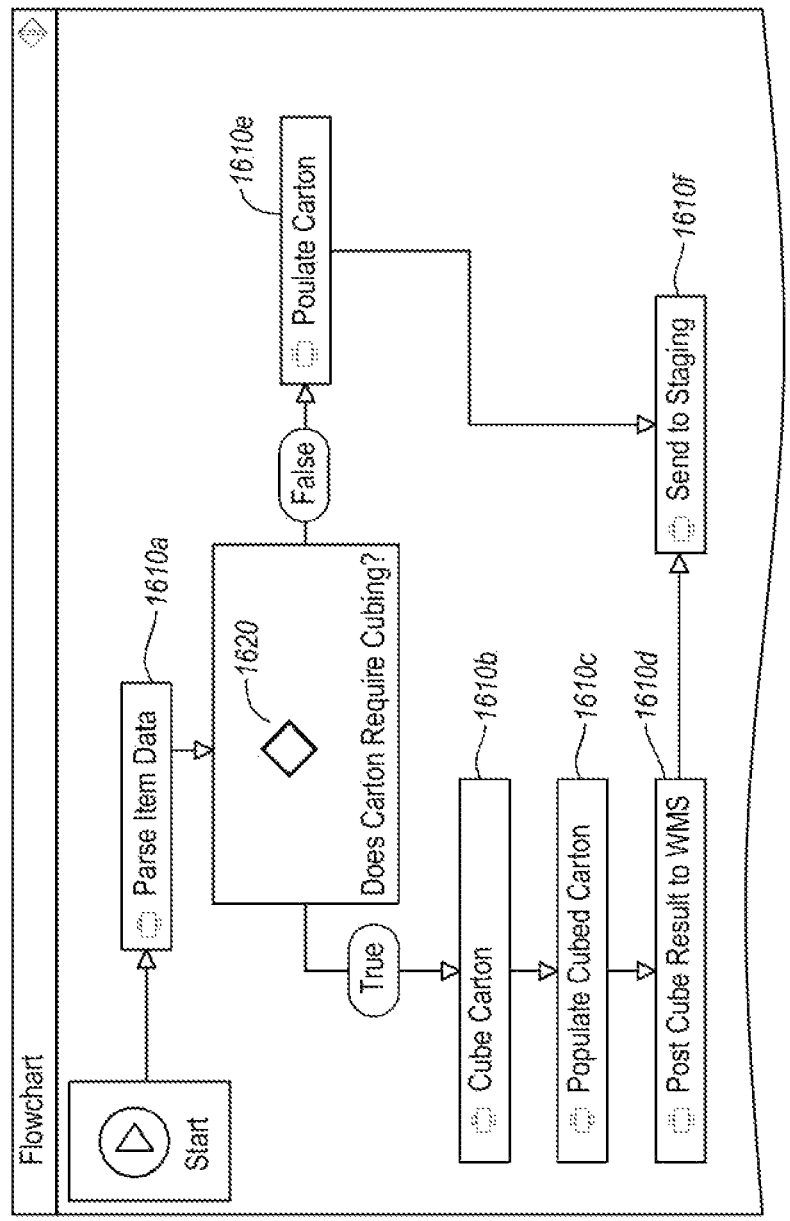
FIG. 16 depicts a flow chart view of an implementation of a plugin in accordance with implementations of the present invention.

FIG. 16 depicts an example of an import module 1550 plugin 1600. In particular, the plugin 1600 is comprised of a decision block 1620 and various action blocks 1610(*a-f*). In at least one implementation, the depicted plugin 1600 can be used to incorporate a particular cubing platform into the importer module 1500. For example, one or more of the action blocks 1600(*a-f*) may comprise scripts, code, settings, and/or parameters configured to communicate with and interact with a cubing platform. Accordingly, in at least one implementation, a custom cubing platform can easily be incorporated into the customizable management system 1400 by simply adding the plugin 1600 to the importer module 1550 through the import plugin module 1550.

Accordingly, FIGS. 1-16 and the corresponding text illustrate or otherwise describe one or more components, modules, and/or mechanisms for configuring a packaging production architecture with a customizable management system. One will appreciate that implementations of the present invention can also be described in terms of methods comprising one or more acts for accomplishing a particular result. For example, FIG. 17 and the corresponding text illustrate or otherwise describe a sequence of acts in a method for configuring a packaging production architecture with a customizable management system. The acts of FIG. 17 are described below with reference to the components and modules illustrated in FIGS. 1-16.

Figure 17:
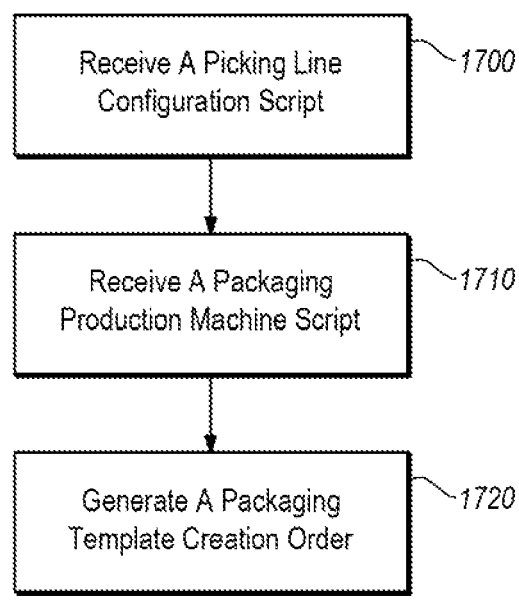
FIG. 17 depicts a flow chart of a method for configuring a packaging production architecture with a customizable management system in accordance with implementations of the present invention.

For example, FIG. 17 illustrates that a method for configuring a packaging production architecture with a customizable management system may include an act 1700 of receiving a picking line configuration script. Act 1700 includes receiving, at a selection module, one or more picking line configuration scripts. The one or more picking line configuration scripts can comprise instructions for interacting with particular picking line architectures. For example, in FIG. 15 and the accompanying description, the search selection algorithm plugin module 1554 can receive configuration scripts (e.g., plugins) that can comprise instructions for interacting with a particular picking line architecture. For example, a particular plugin may correspond to a specific box-first picking line architecture. Using the box-first plugin, the staging module 1510 and/or the selection module 1520 can correctly submit packaging requests to the correct machine group at the correct time.

FIG. 17 also shows that the method can comprise an act 1710 of receiving a packaging production machine script. Act 1710 can comprise receiving, at a machine group module, one or more packaging production machine configuration scripts. The one or more packaging production machine configuration scripts can comprise instructions for interacting with particular machine groups. For example, in FIG. 15 and the accompanying description, the machine group module 1530 can receive configurations scripts that provide instructions to the machine group regarding various different machine groups. For example, packaging architecture may comprise multiple different picking line architectures and associated packaging production machines 102. In at least one implementation, the machine group module 1530 can receive configuration scripts that provide instructions on how to interact with each respective machine group.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer-implemented method, executed on one or more processors, for universally integrating various systems within a variety of unique packaging production architectures, the computer-implemented method comprising:
   receiving, at one or more importer modules, an import plugin module, wherein the import plugin module comprises a decision block and one or more action blocks, the one or more_action blocks comprising scripts and/or parameters configured to communicate with different types of packaging stations;
   receiving, on a user interface, a selection of a visual depiction of a subset of the one or more action blocks, wherein:
      each action block within the subset of the one or more action blocks is configured for a particular type of packaging station and an associated packaging creation request;
   receiving, at the one or more importer modules, packaging creation requests, wherein the packaging creation requests comprise:
      a first packaging creation request for a first box, and
      a second packaging creation request for a second box, wherein at least one of the first packaging creation request or the second packaging creation request is in a format that is not useable by one or more machine group modules;
   translating, using the scripts and/or parameters from the subset of the one or more action blocks, the packaging creation requests into a second format that is readable by one or more staging modules;
   receiving, at the one or more staging modules, translated packaging creation requests from the one or more importer modules, wherein the one or more staging modules determine an order in which the translated packaging creation requests are to be processed such that one or more of the translated packaging creation requests are completed prior to a particular time;
   identifying within each of the translated packaging creation requests one or more final packaging parameters;
   identifying, with one or more selection modules, a particular machine group that is capable of meeting the one or more final packaging parameters, wherein the one or more selection modules identify the particular machine group based on a type of production architectures that is present within the particular machine group, wherein at least one other machine group is associated with a different type of production architecture;
   communicating, with the one or more selection modules, through parameters provided by the one or more action blocks, the translated packaging creation orders to the one or more machine group modules that are in communication with the particular machine group; and
   producing, with the particular machine group, the first box and the second box.

2. The computer-implemented method as recited in claim 1, wherein the one or more selection modules are configured to integrate with one or more distinct packaging architectures.

3. The computer-implemented method as recited in claim 1, further comprising:
   providing, with an importer module plugin, the one or more importer modules with an ability to receive and interpret packaging template requests from a particular production architecture.

4. The computer-implemented method as recited in claim 1, further comprising:
   receiving with a trigger detection component within the one or more selection modules, a trigger that determines a specific packaging template creation order should be sent to a specific machine group.

5. The computer-implemented method as recited in claim 4, wherein one or more machine group configuration scripts determine when the trigger detection component receives a triggering action.

6. The computer-implemented method as recited in claim 1, further comprising:
   providing, with a selection module plugin, a functionality that the one or more selection modules lack.

7. The computer-implemented method as recited in claim 6, wherein the selection module plugin provides the one or more selection modules with an ability to provide packaging template orders within a particular picking line architecture.

8. The computer-implemented method as recited in claim 7, further comprising:
   providing, with a first selection module plugin and to the one or more selection modules, the ability to provide packaging template orders within a first picking line architecture; and
   providing, with a second selection module plugin and to the one or more selection modules, the ability to provide packaging template orders within a second picking line architecture that is different from the first picking line architecture.

9. A computer system for universally integrating various systems within a variety of unique packaging production architectures, comprising:
   one or more processors; and
   one or more computer-readable media having stored thereon executable instructions that when executed by the one or more processors configure the computer system to:
      receive, at one or more importer modules, an import plugin module, wherein the import plugin module comprises a decision block and one or more action blocks, the one or more action blocks comprising scripts and/or parameters configured to communicate with different types of packaging stations;
      receive, on a user interface, a selection of a visual depiction of a subset of the one or more action blocks, wherein:
         each action block within the subset of the one or more action blocks is configured for a particular type of packaging station and an associated packaging creation request;

receive, at the one or more importer modules, packaging creation requests, wherein the packaging creation requests comprises:
    a first packaging creation request for a first box, and a second packaging creation request for a second box,
    wherein at least one of the first packaging creation request or the second packaging creation request is in a format that is not useable by one or more machine group modules;
translate, using the scripts and/or parameters from the subset of the one or more action blocks, the packaging creation requests into a second format that is readable by one or more staging modules;
receive, at the one or more staging modules, translated packaging creation orders from the one or more importer modules, wherein the one or more staging modules determine an order in which the packaging creation requests are to be processed such that one or more of the packaging creation requests are completed prior to a particular time;
identify within each of the translated packaging creation orders one or more final packaging parameters;
identify, with one or more selection modules, a particular machine group that is capable of meeting the one or more final packaging parameters, wherein the one or more selection modules identifies the particular machine group based a type of production architectures that is present within the particular machine group, wherein at least one other machine group is associated with a different type of production architecture;
communicate, with the one or more selection modules, through parameters provided by the one or more action blocks, the translated packaging creation orders to the one or more machine group modules that are in communication with the particular machine group; and
produce, with the particular machine group, the first box and the second box.

10. The computer system as recited in claim 9, wherein the one or more selection modules are configured to integrate with one or more distinct packaging architectures.

11. The computer system as recited in claim 9, wherein the executable instructions include instructions that are executable to configure the computer system to provide, with an importer module plugin, a functionality that the one or more importer modules lack.

12. The computer system as recited in claim 11, wherein the executable instructions include instructions that are executable to configure the computer system to:
    provide, with the importer module plugin, the one or more importer modules with an ability to receive and interpret packaging template requests from a particular production architecture.

13. The computer system as recited in claim 9, wherein the executable instructions include instructions that are executable to configure the computer system to:
    receive with a trigger detection component within the one or more selection modules, a trigger that determines a specific packaging template creation order should be sent to a specific machine group.

14. The computer system as recited in claim 13, wherein one or more machine group configuration scripts determine when the trigger detection component receives a triggering action.

15. The computer system as recited in claim 14, wherein a selection module plugin provides the one or more selection modules with an ability to provide packaging template orders within a particular picking line architecture.

16. The computer system as recited in claim 15, wherein the executable instructions include instructions that are executable to configure the computer system to:
    provide, with a first selection module plugin and to the one or more selection modules, an ability to provide packaging template orders within a first picking line architecture; and provide, with a second selection module plugin and to the one or more selection modules, an ability to provide packaging template orders within a second picking line architecture that is different from the first picking line architecture.

* * * * *